(12) United States Patent
Shinde

(10) Patent No.: US 12,312,063 B2
(45) Date of Patent: May 27, 2025

(54) APPARATUS, METHOD AND SYSTEM FOR BALLOON ALTITUDE CONTROL BY IN-SITU CHARACTERIZATION AND ACTIVE ENERGY MANAGEMENT

(71) Applicant: Space Balloon Technologies Corp., Miami, FL (US)

(72) Inventor: Pradeep Shinde, Miami, FL (US)

(73) Assignee: SPACE BALLOON TECHNOLOGIES CORP., Daytona Beach, FL (US)

( * ) Notice: Subject to any disclaimer, the term of this patent is extended or adjusted under 35 U.S.C. 154(b) by 50 days.

(21) Appl. No.: 18/285,990

(22) PCT Filed: Apr. 5, 2022

(86) PCT No.: PCT/US2022/071552
§ 371 (c)(1),
(2) Date: Oct. 6, 2023

(87) PCT Pub. No.: WO2022/217225
PCT Pub. Date: Oct. 13, 2022

(65) Prior Publication Data
US 2024/0217642 A1    Jul. 4, 2024

Related U.S. Application Data

(60) Provisional application No. 63/201,021, filed on Apr. 8, 2021.

(51) Int. Cl.
*B64B 1/44*    (2006.01)
*B64B 1/62*    (2006.01)

(52) U.S. Cl.
CPC . *B64B 1/44* (2013.01); *B64B 1/62* (2013.01)

(58) Field of Classification Search
CPC .... B64B 1/44; B64B 1/62; B64B 1/60; B64B 1/40; B64B 1/58
See application file for complete search history.

(56) References Cited

U.S. PATENT DOCUMENTS 1,012,559 A * 12/1911 Kalaba ...................... B64B 1/58
244/128
1,056,503 A *  3/1913 Cooper ...................... B64B 1/62
244/128

(Continued)

OTHER PUBLICATIONS

International Search Report of Jun. 16, 2022 for PCT/US2022/071552.

*Primary Examiner* — Medhat Badawi
(74) *Attorney, Agent, or Firm* — GrayRobinson, P.A.

(57) ABSTRACT

The invention comprises an apparatus, method for using the apparatus and system for balloon altitude control by in-situ characterization and active energy management. The invention presented enables transportation, autonomous operation and use of a balloon beyond the limits of conventional high-altitude ballooning to the edge of the atmosphere, or about 100 km above the surface of the Earth. The apparatus comprises at least: an envelope containing lift-gas; an envelope and lift-gas characterizer; an altitude control system operated using active energy addition and lift-gas transfer or ambient air introduction into the system; and an external payload component. The invention is capable of operating in ascent, descent, or stationary mode; the altitudinal movement of the balloon is caused by measuring in-situ envelope and lift-gas characteristics, identifying the change in the lift-gas energy needed, and facilitating the required energy change for altitude control.

18 Claims, 16 Drawing Sheets

(56) References Cited

U.S. PATENT DOCUMENTS

| | | | | |
|---|---|---|---|---|
| 1,477,338 A * | 12/1923 | Finley | B64B 1/00 | 244/30 |
| 1,656,780 A * | 1/1928 | Diago | B64B 1/005 | 244/50 |
| 1,829,561 A * | 10/1931 | Knight | B64D 1/02 | 244/149 |
| 2,083,743 A * | 6/1937 | Poole | B64D 17/00 | 244/149 |
| 2,708,082 A * | 5/1955 | Moore | B64B 1/40 | 244/116 |
| 2,950,881 A * | 8/1960 | Schwoebel | B64B 1/00 | 244/140 |
| 2,954,187 A * | 9/1960 | Winzen | B64B 1/40 | 244/31 |
| 2,977,069 A * | 3/1961 | Huch | B64B 1/40 | 244/31 |
| 3,015,456 A * | 1/1962 | Deisinger | G05D 1/0011 | 244/189 |
| 3,073,040 A * | 1/1963 | Schueller | B64G 1/12 | 434/34 |
| 3,087,696 A * | 4/1963 | Sepp, Jr. | B64D 17/52 | 244/148 |
| 3,093,346 A * | 6/1963 | Faget | B64G 1/12 | 244/159.1 |
| 3,098,630 A * | 7/1963 | Connors | B64D 19/00 | 244/113 |
| 3,146,500 A * | 9/1964 | Volkert | A61B 5/18 | 292/241 |
| 3,195,834 A * | 7/1965 | Huch | B64B 1/40 | 244/31 |
| 3,260,480 A * | 7/1966 | Ash | B64B 1/62 | 244/31 |
| 3,270,908 A * | 9/1966 | Faget | B64G 1/12 | 244/158.9 |
| 3,302,906 A * | 2/1967 | Winker | B64B 1/62 | 244/31 |
| 3,312,427 A * | 4/1967 | Yost | B64B 1/62 | 244/31 |
| 3,424,405 A * | 1/1969 | Struble, Jr. | B64B 1/00 | 244/31 |
| 3,432,122 A * | 3/1969 | Ross | B64B 1/40 | 244/31 |
| 3,434,680 A * | 3/1969 | Ferguson | B64D 1/22 | 244/152 |
| 3,446,458 A * | 5/1969 | Rogallo | B64C 31/032 | 244/901 |
| 3,451,649 A * | 6/1969 | Weiss | B64D 1/64 | 244/99 |
| 3,465,482 A * | 9/1969 | Chandler | F42B 3/093 | 52/99 |
| 3,558,083 A * | 1/1971 | Conley | B64B 1/40 | 244/33 |
| 3,606,212 A * | 9/1971 | Paine | B64G 1/623 | 244/1 R |
| 3,614,031 A * | 10/1971 | Demboski | B64B 1/48 | 244/32 |
| 3,814,353 A * | 6/1974 | Nelson | B64B 1/62 | 244/31 |
| 4,113,206 A * | 9/1978 | Wheeler | B64B 1/08 | 52/63 |
| 4,215,834 A * | 8/1980 | Dunlap | B64B 1/62 | 252/372 |
| 4,664,343 A * | 5/1987 | Lofts | B64G 1/641 | 244/171.1 |
| 4,750,690 A * | 6/1988 | Conn | B64B 1/40 | 244/31 |
| 4,828,207 A * | 5/1989 | Haynes | B64G 1/14 | 244/171.7 |
| 4,889,394 A * | 12/1989 | Ruspa | B60B 7/14 | 301/37.109 |
| 4,936,528 A * | 6/1990 | Butner | B64G 1/56 | 244/171.7 |
| 5,028,018 A * | 7/1991 | Krebber | B64D 17/72 | 244/152 |
| 5,244,169 A * | 9/1993 | Brown | B64D 17/025 | 244/146 |
| 5,274,976 A * | 1/1994 | Burkhart | E06B 3/685 | 52/456 |
| 5,327,904 A * | 7/1994 | Hannum | A61G 10/026 | 128/205.25 |
| 5,333,817 A * | 8/1994 | Kalisz | B64B 1/60 | 244/128 |
| 5,362,017 A * | 11/1994 | Puckett | B64D 17/025 | 244/145 |
| 5,511,748 A * | 4/1996 | Scott | B64G 1/242 | 244/172.5 |
| 5,620,153 A * | 4/1997 | Ginsberg | B64D 17/72 | 244/902 |
| 5,645,248 A * | 7/1997 | Campbell | B64B 1/08 | 244/30 |
| 5,884,981 A * | 3/1999 | Ichikawa | B60B 7/02 | 301/37.36 |
| 5,893,536 A * | 4/1999 | Lee | B64D 17/025 | 244/152 |
| 6,116,538 A * | 9/2000 | Hafelfinger | E04H 15/22 | 244/33 |
| 6,220,547 B1 * | 4/2001 | Smith | B64D 17/025 | 244/152 |
| 6,234,425 B1 * | 5/2001 | Rand | B64D 1/12 | 244/137.4 |
| 6,360,988 B1 * | 3/2002 | Monroe | B64B 1/70 | 244/33 |
| 6,425,640 B1 * | 7/2002 | Hussaini | B60B 7/12 | 301/37.42 |
| 6,527,223 B1 * | 3/2003 | Mondale | B64B 1/06 | 244/30 |
| 6,565,042 B1 * | 5/2003 | Yamada | B64D 17/72 | 244/145 |
| 6,596,370 B2 * | 7/2003 | Hyuga | B29C 45/0025 | 301/108.3 |
| 6,604,333 B1 * | 8/2003 | Schiedegger | G07F 17/3244 | 52/456 |
| 6,626,400 B1 * | 9/2003 | Booth | B64D 17/52 | 244/149 |
| 6,648,272 B1 * | 11/2003 | Kothmann | B64B 1/58 | 244/30 |
| 6,705,572 B1 * | 3/2004 | Christopher | B64D 17/72 | 244/148 |
| 6,799,810 B1 * | 10/2004 | Wang | B60B 7/20 | 301/37.33 |
| 6,811,115 B2 * | 11/2004 | Kurose | B64B 1/70 | 244/30 |
| 6,883,756 B2 * | 4/2005 | Preston | B64D 17/58 | 244/150 |
| 7,046,934 B2 * | 5/2006 | Badesha | H04B 10/118 | 398/131 |
| 7,168,922 B2 * | 1/2007 | Stagg | F04D 29/326 | 416/169 A |
| 7,203,491 B2 * | 4/2007 | Knoblach | B64B 1/64 | 455/431 |
| D557,817 S * | 12/2007 | Verfuerth | D25/48.7 | |
| 7,313,362 B1 * | 12/2007 | Sainct | B64D 5/00 | 244/171.1 |
| 7,356,390 B2 * | 4/2008 | Knoblach | G01S 5/06 | 701/4 |
| D575,410 S * | 8/2008 | Best | D25/48.7 | |
| 7,469,857 B2 * | 12/2008 | Voss | B64B 1/60 | 244/96 |
| 7,530,527 B2 * | 5/2009 | Kelleher | B64U 20/60 | 244/63 |
| 7,556,040 B2 * | 7/2009 | Meyer | A61G 10/026 | 128/202.16 |
| 7,584,928 B2 * | 9/2009 | Hoffmann | B64D 17/54 | 244/152 |
| 7,775,604 B2 * | 8/2010 | Chen | B60B 7/02 | 301/37.102 |
| D632,804 S * | 2/2011 | Afasano | D25/48.3 | |

(56) References Cited

U.S. PATENT DOCUMENTS

| | | | | |
|---|---|---|---|---|
| 8,065,046 B2* | 11/2011 | Bandyopadhyay | B63G 8/14 | 701/1 |
| 8,091,826 B2* | 1/2012 | Voorhees | B64B 1/38 | 244/97 |
| 8,100,367 B1* | 1/2012 | Rousseau | B64D 17/025 | 244/218 |
| 8,116,763 B1* | 2/2012 | Olsen | H04W 16/28 | 455/445 |
| 8,167,240 B2* | 5/2012 | Greiner | B60V 3/08 | 244/97 |
| 8,267,348 B2* | 9/2012 | Alavi | B64B 1/60 | 244/30 |
| 8,448,898 B1* | 5/2013 | Frolov | H01L 31/048 | 244/59 |
| 8,505,847 B2* | 8/2013 | Ciampa | B64B 1/62 | 244/30 |
| 8,718,477 B2* | 5/2014 | DeVaul | H04B 7/18504 | 398/118 |
| 8,777,156 B2* | 7/2014 | Piini | B64B 1/62 | 244/96 |
| 8,781,727 B1* | 7/2014 | Bonawitz | G05D 1/104 | 701/410 |
| 8,804,228 B1* | 8/2014 | Biffle | B64B 1/62 | 359/296 |
| 8,812,176 B1* | 8/2014 | Biffle | B64B 1/62 | 244/175 |
| 8,814,084 B2* | 8/2014 | Shenhar | B64B 1/62 | 244/128 |
| 8,820,678 B2* | 9/2014 | DeVaul | B64B 1/44 | 244/96 |
| 8,833,696 B1* | 9/2014 | Teller | B64B 1/70 | 244/125 |
| 8,849,571 B1* | 9/2014 | Bonawitz | H04B 7/18504 | 701/527 |
| 8,862,403 B1* | 10/2014 | Piponi | H04B 7/18504 | 701/410 |
| 8,874,356 B1* | 10/2014 | Bonawitz | G08G 5/32 | 709/201 |
| 8,880,326 B1* | 11/2014 | Bonawitz | G06Q 10/047 | 701/120 |
| 8,897,933 B1* | 11/2014 | Teller | B64B 1/00 | 701/16 |
| 8,910,905 B2* | 12/2014 | DeVaul | B64B 1/40 | 244/31 |
| 8,917,995 B1* | 12/2014 | Biffle | H04B 10/1129 | 359/837 |
| 8,918,047 B1* | 12/2014 | Teller | H04B 7/18513 | 455/427 |
| 8,948,927 B1* | 2/2015 | Piponi | H04L 12/6418 | 701/2 |
| 8,971,274 B1* | 3/2015 | Teller | H04W 40/02 | 370/329 |
| 8,988,253 B2* | 3/2015 | Teller | B64B 1/40 | 455/12.1 |
| 8,996,024 B1* | 3/2015 | Teller | H04W 84/06 | 455/67.11 |
| 8,998,128 B2* | 4/2015 | Ratner | B64B 1/62 | 244/31 |
| 9,010,691 B1* | 4/2015 | Ratner | B64D 1/12 | 455/431 |
| 9,016,634 B1* | 4/2015 | Ratner | B64D 1/12 | 244/137.4 |
| 9,027,874 B1* | 5/2015 | Roach | B64B 1/40 | 244/31 |
| 9,033,274 B2* | 5/2015 | DeVaul | B64B 1/62 | 244/31 |
| 9,033,281 B1* | 5/2015 | Adams | B64U 50/14 | 244/190 |
| 9,045,213 B1* | 6/2015 | DeVaul | B64B 1/62 | |
| 9,067,666 B1* | 6/2015 | Roach | B64B 1/42 | |
| 9,085,348 B1* | 7/2015 | Roach | D03D 13/008 | |
| 9,090,323 B1* | 7/2015 | Ratner | B64B 1/62 | |
| 9,093,754 B2* | 7/2015 | Behroozi | H01Q 3/16 | |
| 9,096,301 B1* | 8/2015 | Biffle | B64B 1/42 | |
| 9,097,361 B1* | 8/2015 | Ratner | F16K 15/147 | |
| 9,106,336 B1* | 8/2015 | Brouillet | H04B 10/1129 | |
| 9,114,866 B1* | 8/2015 | Roach | B64B 1/40 | |
| 9,120,551 B1* | 9/2015 | Ratner | B64F 1/04 | |
| 9,139,278 B1* | 9/2015 | Roach | B64D 17/54 | |
| 9,139,279 B2* | 9/2015 | Heppe | B64B 1/54 | |
| 9,148,215 B1* | 9/2015 | Bonawitz | H04B 7/18506 | |
| 9,153,854 B1* | 10/2015 | Biffle | H04B 7/18502 | |
| 9,174,718 B1* | 11/2015 | Roach | B64B 1/60 | |
| 9,174,720 B1* | 11/2015 | Ratner | B64B 1/64 | |
| 9,174,738 B1* | 11/2015 | Roach | B64B 1/40 | |
| 9,193,480 B2* | 11/2015 | Smith | B64B 1/44 | |
| 9,195,938 B1* | 11/2015 | Bonawitz | G08G 5/32 | |
| 9,201,426 B1* | 12/2015 | Bonawitz | G05D 1/105 | |
| 9,203,148 B1* | 12/2015 | Teller | H01Q 5/22 | |
| 9,211,942 B1* | 12/2015 | Roach | B64B 1/62 | |
| 9,221,531 B1* | 12/2015 | Brookes | B64B 1/62 | |
| 9,233,746 B2* | 1/2016 | DeVaul | G05D 1/042 | |
| 9,242,712 B1* | 1/2016 | Ratner | B64B 1/58 | |
| 9,254,906 B1* | 2/2016 | Behroozi | B64B 1/58 | |
| 9,266,598 B1* | 2/2016 | DeVaul | B64B 1/42 | |
| 9,275,551 B2* | 3/2016 | Bonawitz | G08G 5/57 | |
| 9,281,554 B1* | 3/2016 | Behroozi | H01Q 15/14 | |
| 9,285,450 B2* | 3/2016 | DeVaul | G01S 19/03 | |
| 9,290,258 B1* | 3/2016 | DeVaul | B64B 1/62 | |
| 9,296,461 B1* | 3/2016 | Roach | B64B 1/40 | |
| 9,296,462 B1* | 3/2016 | Brookes | B64B 1/58 | |
| 9,300,388 B1* | 3/2016 | Behroozi | H04B 7/18504 | |
| 9,306,668 B2* | 4/2016 | DeVaul | G05D 1/0094 | |
| 9,318,789 B1* | 4/2016 | Henrich | H01Q 1/082 | |
| 9,321,517 B1* | 4/2016 | DeVaul | G01W 1/10 | |
| 9,327,816 B1* | 5/2016 | Mathe | B64B 1/44 | |
| 9,327,817 B1* | 5/2016 | Roach | B64B 1/58 | |
| 9,327,818 B1* | 5/2016 | Roach | B64B 1/40 | |
| 9,329,600 B2* | 5/2016 | DeVaul | H02S 20/30 | |
| 9,340,272 B1* | 5/2016 | DeVaul | B64B 1/70 | |
| 9,346,531 B1* | 5/2016 | Washburn | B64B 1/40 | |
| 9,346,532 B1* | 5/2016 | Ratner | B64B 1/62 | |
| 9,463,861 B2* | 10/2016 | Smith | B64B 1/42 | |
| 9,540,091 B1* | 1/2017 | MacCallum | B64B 1/58 | |
| 9,561,858 B2* | 2/2017 | Leidich | B64D 17/72 | |
| 9,694,910 B2* | 7/2017 | MacCallum | B64B 1/02 | |
| 9,701,061 B1* | 7/2017 | Roach | B29C 66/43 | |
| 10,059,420 B1* | 8/2018 | Hall-Snyder | B64B 1/46 | |
| 10,124,875 B1* | 11/2018 | Farley | B64B 1/40 | |
| 10,212,610 B2* | 2/2019 | Gayrard | H04W 16/26 | |
| 10,336,432 B1* | 7/2019 | Farley | B64B 1/40 | |
| 10,404,353 B2* | 9/2019 | Van Wynsberghe | B64G 1/42 | |
| 10,437,259 B2* | 10/2019 | Candido | G08G 5/22 | |
| 10,437,260 B2* | 10/2019 | Candido | G08G 5/0052 | |
| 10,737,754 B1* | 8/2020 | Farley | B64B 1/58 | |
| 10,787,268 B2* | 9/2020 | Leidich | B64D 17/76 | |
| 10,809,718 B2* | 10/2020 | Candido | G08G 5/0013 | |
| 10,829,192 B1* | 11/2020 | Farley | B64B 1/62 | |
| 10,829,229 B2* | 11/2020 | MacCallum | B64D 17/64 | |
| D905,175 S * | 12/2020 | Sweeney | D21/440 | |
| 10,988,227 B2* | 4/2021 | MacCallum | B64B 1/70 | |
| 11,072,410 B1* | 7/2021 | MacCallum | B64B 1/62 | |
| 11,084,564 B1* | 8/2021 | Farley | B64D 1/12 | |
| 11,254,409 B2* | 2/2022 | Behroozi | B64B 1/40 | |
| 11,332,253 B2* | 5/2022 | Yakimenko | B64B 1/48 | |
| 11,447,226 B1* | 9/2022 | Farley | B64B 1/48 | |
| 11,511,843 B2* | 11/2022 | Farley | B64B 1/62 | |
| 11,559,010 B2* | 1/2023 | Cardi | A01G 15/00 | |
| 11,904,999 B2* | 2/2024 | Farley | B64B 1/58 | |
| D1,025,874 S * | 5/2024 | Johnson | D12/406 | |
| 11,993,359 B2* | 5/2024 | Prescott | B64D 11/00 | |
| 2002/0179771 A1* | 12/2002 | Senepart | B64B 1/60 | 244/97 |
| 2002/0190161 A1* | 12/2002 | Patel | B64G 1/12 | 244/158.1 |
| 2003/0020322 A1* | 1/2003 | Zaniboni | B60B 7/08 | 301/37.101 |
| 2003/0040273 A1* | 2/2003 | Seligsohn | B64B 1/48 | 455/12.1 |
| 2003/0127560 A1* | 7/2003 | Liss | B64B 1/58 | 244/30 |

(56) References Cited

U.S. PATENT DOCUMENTS

| | | | |
|---|---|---|---|
| 2003/0197095 A1* | 10/2003 | Preston | B64D 17/38 244/152 |
| 2003/0234320 A1* | 12/2003 | Colting | B64B 1/32 244/96 |
| 2004/0089763 A1* | 5/2004 | Redmond | B64D 27/24 244/10 |
| 2004/0218397 A1* | 11/2004 | Luo | B60B 7/08 362/500 |
| 2005/0121968 A1* | 6/2005 | McCaster, III | B60B 7/0013 301/37.25 |
| 2005/0288114 A1* | 12/2005 | Meadows | B64C 31/04 472/134 |
| 2006/0065777 A1* | 3/2006 | Walden | B64B 1/60 244/128 |
| 2006/0284006 A1* | 12/2006 | Chasman | F02K 9/86 239/265.19 |
| 2007/0164600 A1* | 7/2007 | Chiu | B60B 7/20 301/37.25 |
| 2007/0272801 A1* | 11/2007 | Hilliard | B64D 17/025 244/142 |
| 2008/0135678 A1* | 6/2008 | Heaven | B64B 1/60 244/30 |
| 2009/0108135 A1* | 4/2009 | Shaw | B64C 3/30 244/30 |
| 2009/0134277 A1* | 5/2009 | Kim | A62B 1/00 244/149 |
| 2009/0189015 A1* | 7/2009 | Alavi | B64B 1/60 244/97 |
| 2009/0206196 A1* | 8/2009 | Parks | B64U 30/12 244/49 |
| 2009/0224094 A1* | 9/2009 | Lachenmeier | B64U 70/20 244/31 |
| 2010/0163682 A1* | 7/2010 | Jameson | B64D 17/025 244/145 |
| 2010/0257983 A1* | 10/2010 | Jordan | B26D 1/08 83/13 |
| 2011/0147513 A1* | 6/2011 | Surmont | B64B 1/42 244/33 |
| 2011/0198437 A1* | 8/2011 | Brandon | B64B 1/40 244/25 |
| 2011/0233325 A1* | 9/2011 | Kramer | B64B 1/58 244/30 |
| 2011/0297784 A1* | 12/2011 | Huens | B64D 17/72 83/13 |
| 2012/0091261 A1* | 4/2012 | Lee | B64B 1/50 244/33 |
| 2012/0133197 A1* | 5/2012 | Mengle | B60B 7/04 301/37.107 |
| 2012/0168565 A1* | 7/2012 | Berland | B64D 17/025 244/152 |
| 2012/0228434 A1* | 9/2012 | Lopez | B64G 1/005 244/158.9 |
| 2012/0235410 A1* | 9/2012 | Serrano | H02S 10/12 244/33 |
| 2012/0273620 A1* | 11/2012 | Culbreath | A63B 43/007 244/145 |
| 2012/0312919 A1* | 12/2012 | Heppe | B64B 1/00 244/33 |
| 2013/0007935 A1* | 1/2013 | Chin | B64G 1/005 244/33 |
| 2013/0037654 A1* | 2/2013 | Zhang | B64B 1/62 244/31 |
| 2013/0043341 A1* | 2/2013 | Tai | B64B 1/62 244/30 |
| 2013/0049440 A1* | 2/2013 | Morse | B60B 7/066 301/37.42 |
| 2013/0062458 A1* | 3/2013 | Shenhar | B64B 1/62 701/2 |
| 2013/0146703 A1* | 6/2013 | Pecnik | B64B 1/58 244/30 |
| 2013/0175387 A1* | 7/2013 | DeVaul | B64B 1/60 244/31 |
| 2013/0177322 A1* | 7/2013 | DeVaul | H04B 7/18504 398/131 |
| 2013/0238784 A1* | 9/2013 | Teller | H04B 10/118 709/224 |
| 2013/0303218 A1* | 11/2013 | Teller | H04W 16/04 455/507 |
| 2014/0014770 A1* | 1/2014 | Teller | B64B 1/62 244/96 |
| 2014/0155093 A1* | 6/2014 | Teller | H04W 4/021 455/456.3 |
| 2014/0171075 A1* | 6/2014 | Teller | H04B 10/118 455/456.6 |
| 2014/0188377 A1* | 7/2014 | Bonawitz | G08G 5/55 701/120 |
| 2015/0024653 A1* | 1/2015 | Huebl | A63H 33/20 446/52 |
| 2015/0061937 A1* | 3/2015 | Bonawitz | G01S 5/0289 342/451 |
| 2015/0225091 A1* | 8/2015 | Ratner | B64B 1/005 244/63 |
| 2015/0336653 A1* | 11/2015 | Anderson | B64B 1/62 417/423.1 |
| 2015/0367928 A1* | 12/2015 | Crites | B29C 66/723 156/247 |
| 2016/0018823 A1* | 1/2016 | Longmier | G01W 1/08 701/4 |
| 2016/0052614 A1* | 2/2016 | Longmier | G05D 1/105 701/4 |
| 2016/0083068 A1* | 3/2016 | Crites | B64B 1/14 244/31 |
| 2016/0090179 A1* | 3/2016 | Childress | B64C 29/0091 244/63 |
| 2016/0096612 A1* | 4/2016 | Longmier | B64B 1/58 244/31 |
| 2017/0081011 A1* | 3/2017 | Matthews | B64B 1/46 |
| 2017/0081012 A1* | 3/2017 | Matthews | B64B 1/40 |
| 2017/0129579 A1* | 5/2017 | de Jong | B64B 1/44 |
| 2024/0217642 A1* | 7/2024 | Shinde | B64B 1/60 |

* cited by examiner

A

B

APPARATUS, METHOD AND SYSTEM FOR BALLOON ALTITUDE CONTROL BY IN-SITU CHARACTERIZATION AND ACTIVE ENERGY MANAGEMENT

CROSS-REFERENCE TO RELATED APPLICATIONS

This application claims the benefit of the prior filing date under 35 U.S.C. § 119(e) of U.S. Provisional Application No. 63/201,021, filed on Apr. 8, 2021.

STATEMENT REGARDING FEDERALLY SPONSORED RESEARCH/DEVELOPMENT

Not applicable.

REFERENCE TO SEQUENCE LISTING, A TABLE, OR COMPUTER PROGRAM LISTING COMPACT DISC APPENDIX

Not applicable.

BACKGROUND

This non-provisional patent application relates to the field of ultra-high altitude balloon flight. More specifically, it discloses an apparatus, methodology and system for balloon altitude control by in-situ characterization and active energy management for transporting the balloon beyond the limits of conventional high-altitude ballooning. Conventional devices and methodology encompass flight to about 40 km above the surface of the earth; the present invention is designed for balloon travel and control up to the edge of the atmosphere as known, to about 100 km above the surface of the Earth.

Balloons and ballooning systems that include a wide range of configurations, components and capabilities (hereinafter "balloon" or "balloons") have been used for centuries for travel, exploration, and data collection. With practical applicability ranging from early transportation services through weather data collection and mapping to satellite observations and beyond, and particularly including ballooning systems that include propulsion such as dirigibles and blimps, balloons have been the subject of innovation. Today, systems are described and used that deploy complicated atmospheric sensing and global positioning (GPS) instrumentation. Innovation in balloon logistics controls include inventions that position systems relative to the sun, various envelope-within-envelope configurations, and lighter-than-air (LTA) multi-chamber gas exchange systems. Maneuverability, altitude control and payload capacity have significantly improved with recent technological advancement, rendering the field of balloon technology ready to reach new heights.

Current ballooning technology has primarily been limited to operations within Earth's troposphere and stratosphere by atmospheric conditions as well as limitations in information transmission. Present inventions are typically limited to atmospheric environments where the distance from Earth is under 40 km, where they can safely and reliably operate. Extreme environmental and weather conditions exist beyond these altitudes, including temperatures to −60 degrees Celsius, thermal and zonal winds, and atmospheric gravity waves and tides. These extreme conditions limit operation as a function of distance from earth for practical application of presently emerging satellite and related ultra-high-altitude technology. The presently disclosed apparatus, method and system is capable of functioning in standard ballooning environments and is further designed and targeted for operation in extreme environmental and weather conditions of ultra-high-altitude environments including the mesosphere, extending from about 50 km through about 90 km, and beyond.

SUMMARY

The present invention is directed to a balloon apparatus, methodology for operating the apparatus, and a system wherein the apparatus is operated using the methodology for various applications. The invention's apparatus is used for balloon altitude control, and comprises a balloon capable of withstanding extreme environmental and weather conditions at altitudes up to at least 80 km above the earth's surface. The invention is controlled and operated autonomously, meaning that it functions on its own using preprogrammed information, and does not require remote operation and control. The system has the ability to operate in either in a default mode, wherein the information for operations has been pre-programmed into the system, or a remote mode, which enables the system to detect, acquire and use data transmitted remotely from a source outside of the apparatus.

This invention is distinguished from typical ballooning apparatus and systems in that the system does not add or remove gas from a balloon, but instead adds or removes energy, which changes the property of the gas contained within the balloon's expandable envelope. In a preferred embodiment, the apparatus comprises at least: an envelope containing lift-gas; an altitude control system that includes an envelope and lift-gas characterizer that facilitates active energy addition and lift-gas transfer or ambient air introduction into the system, and an extension for the external payload. The lift-gas contained in the envelope can be lighter than the ambient fluid (the air outside of the system) of the environment in which the apparatus operates, in general. A distinct advantage of the present invention is that it is equally applicable, and will perform as intended for its use in applications where the lift-gas is heavier or equal to the ambient fluid of the environment in which the apparatus operates. The altitude control system is configured to cause the balloon to operate in ascent, descent, or stationary mode, and the altitudinal movement of the balloon is caused by measuring in-situ envelope and lift-gas characteristics, identifying the change in the lift-gas energy needed, and facilitating the required energy change by active heat addition into the system and by regulating the lift-gas transfer out of the envelope, or by introducing an ambient fluid (generally atmospheric air) inside the system. In one embodiment, the altitude control system includes a digitally or electronically integrated processor and controller that cooperate to actively monitor and control the components of the altitude control system. The altitude control system can also include a communications system for data and information transfer with remote stations. Remote stations can be a communication hub, other altitude control systems in individual or network form, as well as ground stations. The altitude control system can also include a recordable media to access, execute and store the data. In one embodiment of the invention, the altitude control system includes a power hub to provide power for the system components. The altitude control system can also include an extension to provide an external attachment for the payload to be carried along. The system disclosed herein includes the apparatus operated according to the methodology and process for in-situ characterization integrated altitude control.

The features and advantages of the invention may be realized and obtained by means of the instruments and combinations described herein. These as well as additional features, aspects, advantages, and alternatives of the invention will be set forth in the description which follows or may be learned by the practice of the invention.

This summary broadly describes some of the features of the balloon altitude control by in-situ characterization and active energy management apparatus, method and system in order that the detailed description thereof may be better understood, and in order that the present contribution to the art may be better appreciated. There are additional features of the invention that will be described hereinafter that will form the subject matter of the claims appended hereto. It is to be understood that the invention as herein described is not limited in its application to the details of construction or to the specific arrangements of the components set forth in the following description or illustrated in the drawings. The balloon altitude control by in-situ characterization and active energy management apparatus, method and system is capable of other embodiments and of being practiced and carried out in various ways.

It is an object of this invention to provide a device, method and system for transporting a balloon beyond the limits of conventional high altitude ballooning, from about 40 km above the surface of the Earth up to the edge of the atmosphere, about 100 km above the surface of the Earth.

It is another object of this invention to provide a device, method and system that may be utilized as a platform for a payload transport.

It is a different object of the invention to provide a device, method and system that may be utilized as a payload transport system for surveillance, monitoring, communications and/or reconnaissance, atmospheric measurements and/or monitoring, mesospheric studies and/or monitoring, and weather prediction and/or monitoring.

A further object of this invention is to provide a platform for technology testing, maturity, and/or demonstrations.

Another object of this invention is to provide controlled access to the mesosphere including altitudes up to at least 80 km, that can effectuate or assist in payload and/or balloon recovery, eliminate or minimize the need for chutes or parachutes for the recovery of data, equipment or payloads.

Still another object of this invention is to enable transport of the balloon and/or the payload beyond stratospheric altitude limit of 40 km into the mesosphere, including altitudes up to 80 km for long duration (greater than hour) that is not possible using existing rocket launchers and conventional high altitude ballooning.

A different object of this invention is to provide a platform for educational and scientific discovery purposes.

An object of the invention is also to provide a platform for ground and air traffic detection, monitoring, and/or management.

Another object of the invention is to provide a platform to launch rockets or space vehicles.

A different object is to provide a device, method and system according to the disclosure herein that may be utilized in the atmosphere of any planet of any solar system.

An additional object of the invention is to provide a platform to increase the understanding of the unknowns of today, such as aurora or noctilucent clouds of the mesosphere.

Another object is to provide a platform for meteorite observation and/or studies.

Still another object of the invention is to provide a device, method and system as an alternative and green platform for suborbital transport that eliminates the need to utilize combustible fuel for suborbital transport.

Other objects and advantages of the various embodiments of the present invention will become obvious to the reader, and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of this application.

| REFERENCE CHARACTERS USED IN THE DRAWINGS | |
|---|---|
| 20: | Balloon |
| 21: | Envelope |
| 22: | Neck |
| 23: | Lift-gas |
| 30: | External Payload |
| 31: | Payload Component |
| 32: | Payload Connecting Extension |
| 40: | External Antenna |
| 41: | Antenna Element |
| 100: | Altitude Control System |
| 110: | External Fluid Isolator |
| 111: | External Fluid Isolator Side Wall |
| 112: | Locking Mechanism |
| 113: | Environmental Aperture |
| 114: | Antenna Aperture |
| 115: | Payload Aperture |
| 116: | Collar Face |
| 120: | Surface Enclosure |
| 130: | Control System Housing |
| 131: | Control System Housing Side Wall |
| 132: | Power Switch |
| 132a: | Power Switch Aperture |
| 133: | Hook for the Payload |
| 133a: | Payload Hook Pass Through Aperture |
| 134: | Cap Hook |
| 134a: | Cap Hook Pass Through Aperture |
| 135: | Antenna Connection |
| 135a: | Antenna Passage |
| 136: | Cap |
| 136a: | Control System Housing Central Pass Through Passage |
| 137: | Ambient Air Pass Through Opening |
| 140: | Body |
| 141: | Central Housing |
| 141a: | Body Central Pass Through Passage |
| 141b: | Wiring Passage |
| 141c: | Central Housing Tappings |
| 141d: | Passage for Environmental-flow Control Device |
| 142: | Gas Transport System |
| 142a: | Flow Conduit |
| 142b: | Flow Element |
| 142c: | In-flow Control Device |
| 142d: | Flow Element Tappings |
| 142e: | Ambient Tapping |
| 143: | Active energy addition system |
| 143a: | Motor |
| 143b: | Slider Housing |
| 143c: | Isolator |
| 143d: | Active Energy Addition Element |
| 144: | Flow Sensing Device |
| 145: | Flow Regulator |
| 146: | Environmental flow Control Device |
| 147: | Processor |
| 150: | Power Source |
| 160: | Characterizer |
| 161: | Sensors Foundation Wall |
| 162: | IR Device |
| 162a: | IR Device Housing |
| 163: | Direct Contact Sensor |
| 163a: | Direct Contact Sensor Housing |
| 164: | Pressure Sensor |

-continued

REFERENCE CHARACTERS USED IN THE DRAWINGS

| | |
|---|---|
| 164a: | Pressure Sensor Housing |
| 165: | Characterizer Central Pass Through Passage |
| 166: | Pass Through Aperture |
| 170: | Exposure Control |
| 171: | Exposure Control Large Aperture |
| 172: | Exposure Control Small Aperture |
| 173: | Sliding Knob |
| 174: | Exposure Control Central Pass Through Passage |
| 180: | Internal Fluid Isolator |
| 181: | Fluid Isolator Large Aperture |
| 182: | Fluid Isolator Small Aperture |
| 183: | Groove |
| 184: | Internal Fluid Isolator Central Pass Through Passage |

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

Figure 1A:
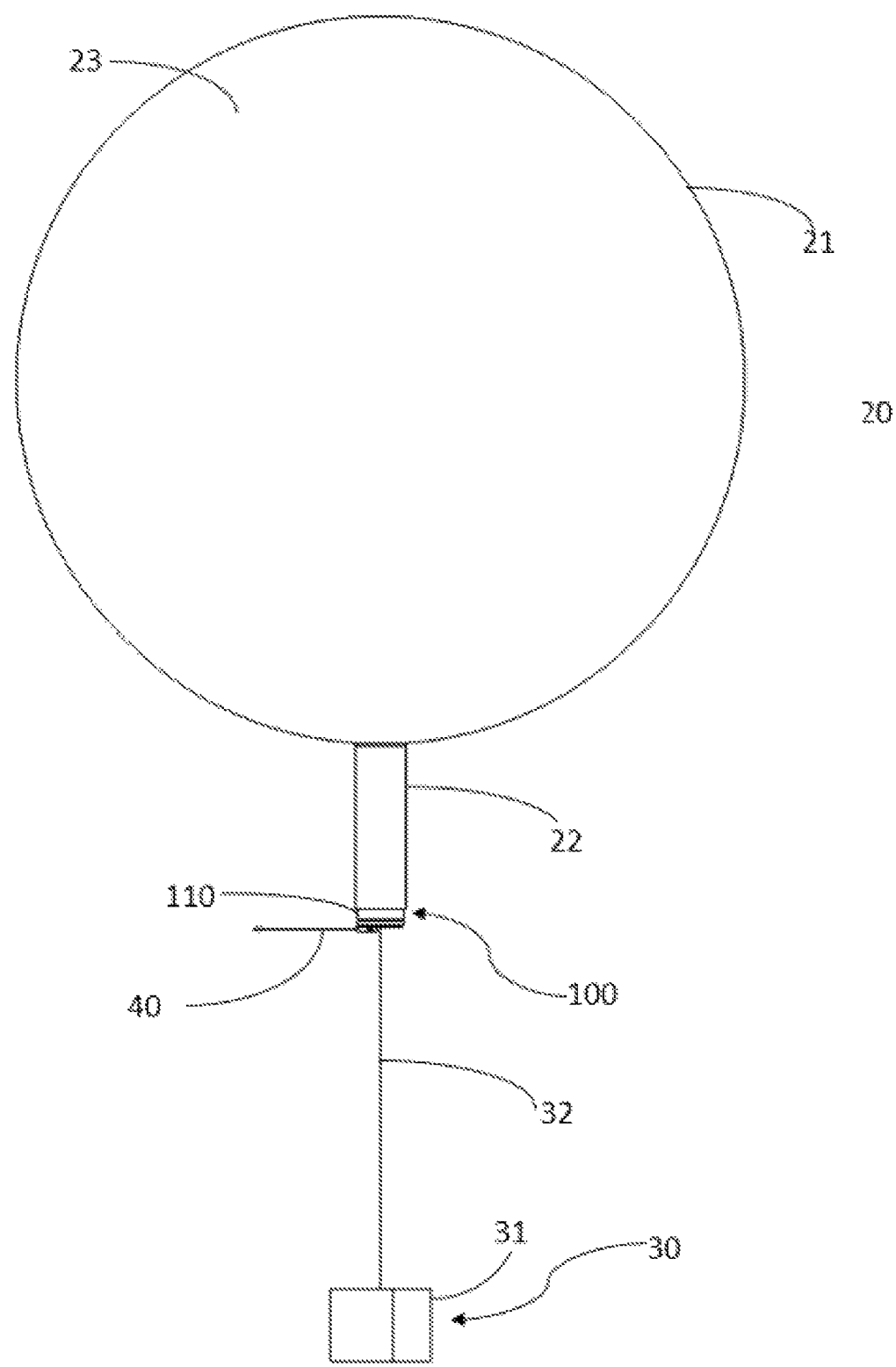
FIG. 1A is a front view of the apparatus of the invention disclosed herein.

Turning now descriptively to the drawings, in which similar reference characters denote similar elements throughout the several views, the figures illustrate an example of a preferred embodiment.

FIGS. 1A-1D illustrate generally an embodiment of the device of the invention. A balloon 20 comprising an envelope 21 encompasses a lift-gas 23 and is in removeable contact with a neck 22. The apparatus's altitude can be raised by decreasing the density of the lift-gas 23. This is accomplished by adding energy to the lift-gas 23, which increases the volume of the lift-gas 23 and thereby makes it lighter, and therefore decreases the density of the lift-gas 23. The required energy change is accomplished by active heat addition into the system and by regulating the lift-gas transfer out of the envelope, or by introducing an ambient fluid, typically comprised of outside air, inside the system. This results in the expansion of the envelope 21 and therefore facilitates the ascent of the balloon 20. The system facilitates descent by mass transfer and release of the lift-gas 23 out of the system via the neck 22 of the balloon 20, reducing the volume, and therefore contracting the envelope 21. Addition of a controlled amount of colder ambient air into the envelope 21 filled with the lift-gas 23 through the neck 22 of the balloon 20 reduces the lift-gas 23 temperature and alters the concentration of the lit-gas 23 by the amount of added ambient air. This facilitates the volume reduction due to cooling of the lift-gas 23. Addition of a specific amount of external air, which is heavier than the original lift-gas 23, into the envelope 21 via the balloon neck 22 reduces the lift of the system, in addition to increasing the overall mass of the mixture. This facilitates descent or stationary mode of the transit of the balloon 20, depending on the rate of added amount of the ambient air into the system and the total quantity of added ambient air. The variation in the volume of the envelope 21 is visualized by comparison to the centerline in FIG. 1B. The descent of the apparatus following its ascent, is also facilitated without the mass transfer of the lift-gas 23, and by simply dissipating the added energies of the lift-gas 23 into the surrounding environment via envelope 21 in the form of passive energy exchange between the surrounding environment and the envelope 21.

FIG. 1A is a front view of the device of the invention. In this figure, a balloon 20 comprises an envelope 21 that is filled with a lift-gas 23. The balloon 20 is in contact with and connected to a neck 22, further comprising an altitude control system 100, an external fluid isolator 110 and an external antenna 40. The altitude control system 100 performs its operation independently or in communication with remote stations using one or more onboard processors 147 and integrated (linked, coordinated or connected with digitally or electronically) controllers via an external antenna 40 connected to the altitude control system 100. A payload component 31 is detachable and connected to the neck 22 via a payload connecting extension 32, which supports and removeably attaches to the external payload 30. The mission specific atmospheric altitude variation requirements of the payload can be fulfilled by varying the altitude of the balloon 20 in the desired operational mode including at least ascent, descent, and stationary mode options. The payload can be of any form, type, shape, and size. Specific examples of the payload include but are not limited to scientific and academic research tools and equipment, military-specific devices and components, cargo, or even rockets.

Figure 1B:
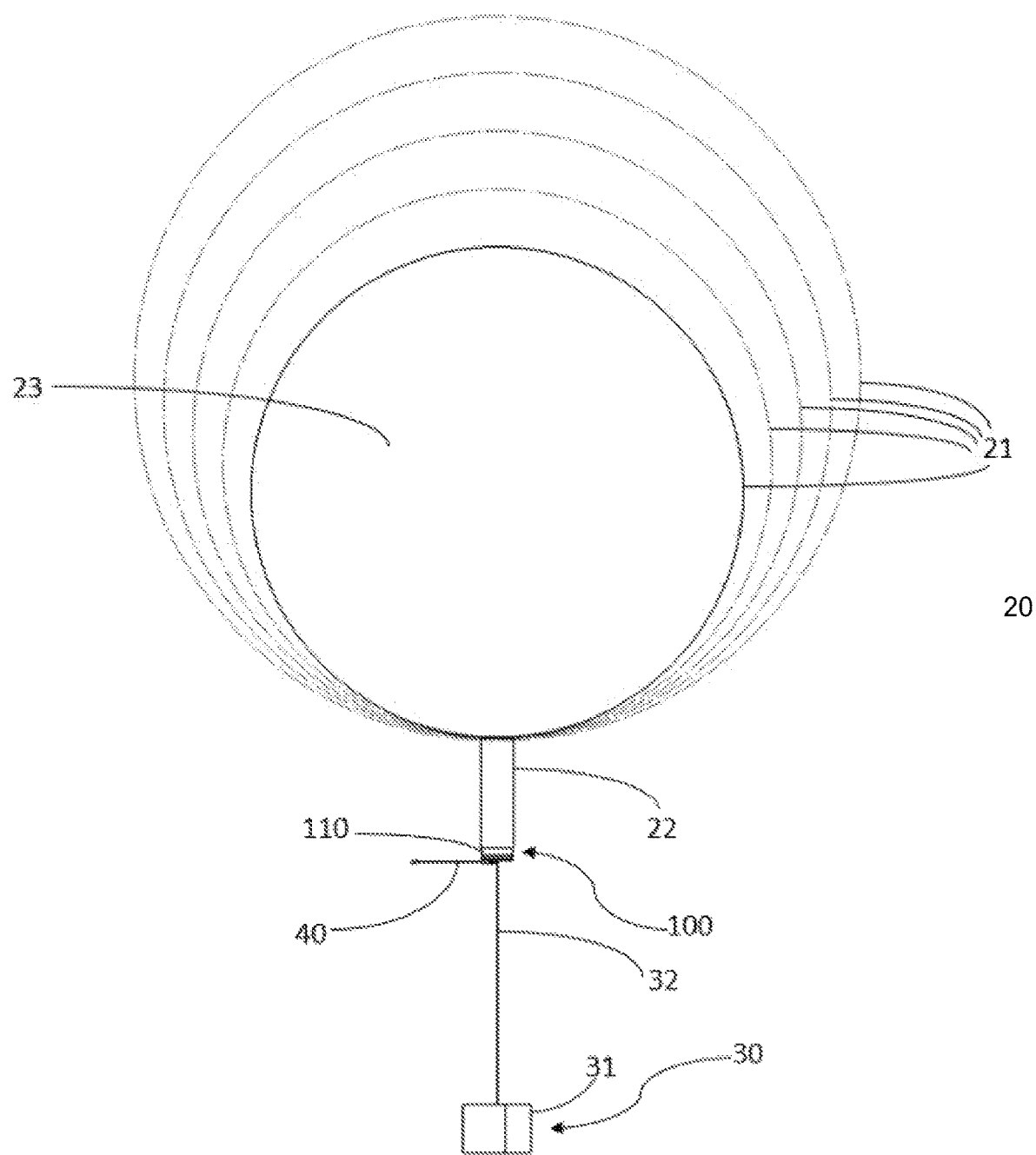
FIG. 1B is a front view of the invention illustrating volume change of the system shown in FIG. 1A.

FIG. 1B is a front view of the invention illustrating volume change of the device of the invention shown in FIG. 1A. The envelope 21 is in releasable air-tight contact with the neck 22, and is capable of mechanical and electronic or digital interaction with an altitude control system. In this figure, the original envelope 21 is shown to expand; the dotted lines illustrate the envelope 21 in various expanded configurations. Altitude variation by active and controlled energy addition can be attained using an envelope 21 that is flexible in nature, or capable of expansion and contraction in the size in order to accommodate the volumetric change in the lift-gas 23. The envelope 21 can be fabricated from a single continuous or a plurality of connected sheets or film of gas-impermeable material, capable of containing gas completely, of any shape and size with some degree of flexibility, including reflexive properties such that it can expand and contract to a previous configuration. Appropriate materials include but are not limited to rubber, polyethylene, latex, or mylar. One skilled in the art would recognize that other gas-impermeable, flexible materials capable of forming films and sheets could be used in manufacture of the envelope and still fall within this disclosure. Additionally, in one or more embodiments the system can utilize passive solar energy to provide energy to the system. The envelope 21 can be made or coated with highly absorptive material to increase the amount of solar energy absorbed by the lift-gas 23, and therefore reduce the amount of load, or active energy addition into the lift-gas 23 that is used for altitude control. For example, the envelope 21 can be made from or with materials capable of absorbing solar radiation, or coated or otherwise functionally connected with an absorptive layer on an external surface, increasing the amount of the solar energy absorbed by the lift-gas 23, and therefore reduce the amount of active energy addition into the lift-gas 23.

The envelope 21 encompasses the lift-gas 23. The lift-gas contained in the envelope can be lighter than, heavier or equal to the ambient fluid of the environment in which the apparatus operates. Generally, helium or hydrogen may be used, though one skilled in the art would appreciate that other gases capable of responding to the addition or removal of energy could be used and still remain within the scope of this invention. Energy addition to the lift-gas 23 increases the volume of the lift-gas 23, and therefore decreasing the lift-gas density. On the other hand, mass transfer of the lift-gas or energy removal out of the system reduces the volume. Addition of colder ambient air into the envelope 21 encompassing the lift-gas 23 reduces the lift-gas temperature, allowing the lift-gas to cool with mass addition, thereby altering the newly configured lift-gas 23 mixture from the original amount of the lift-gas with the added ambient air. This change in the lift-gas temperature facilitates the lift-gas volume reduction. Addition of a specific amount of external gas, or air, which is heavier and/or colder than the original lift-gas 23 into the envelope 21 reduces the lit of the system due to the higher density of the air than the original lift-gas 23, with addition to the increased overall mass of the mixture. This results in the descent or stationary mode of the balloon transit.

FIG. 1B also shows the neck 22, and payload components including the payload component 31 of the external payload 30 and its connection to the altitude control system 100 via payload connecting extension 32. An external fluid isolator 110 is in contact with an external antenna 40, which facilitates the data and information transfer between the altitude control system 100 and a remote station (aerial or on the ground).

Figure 1C:
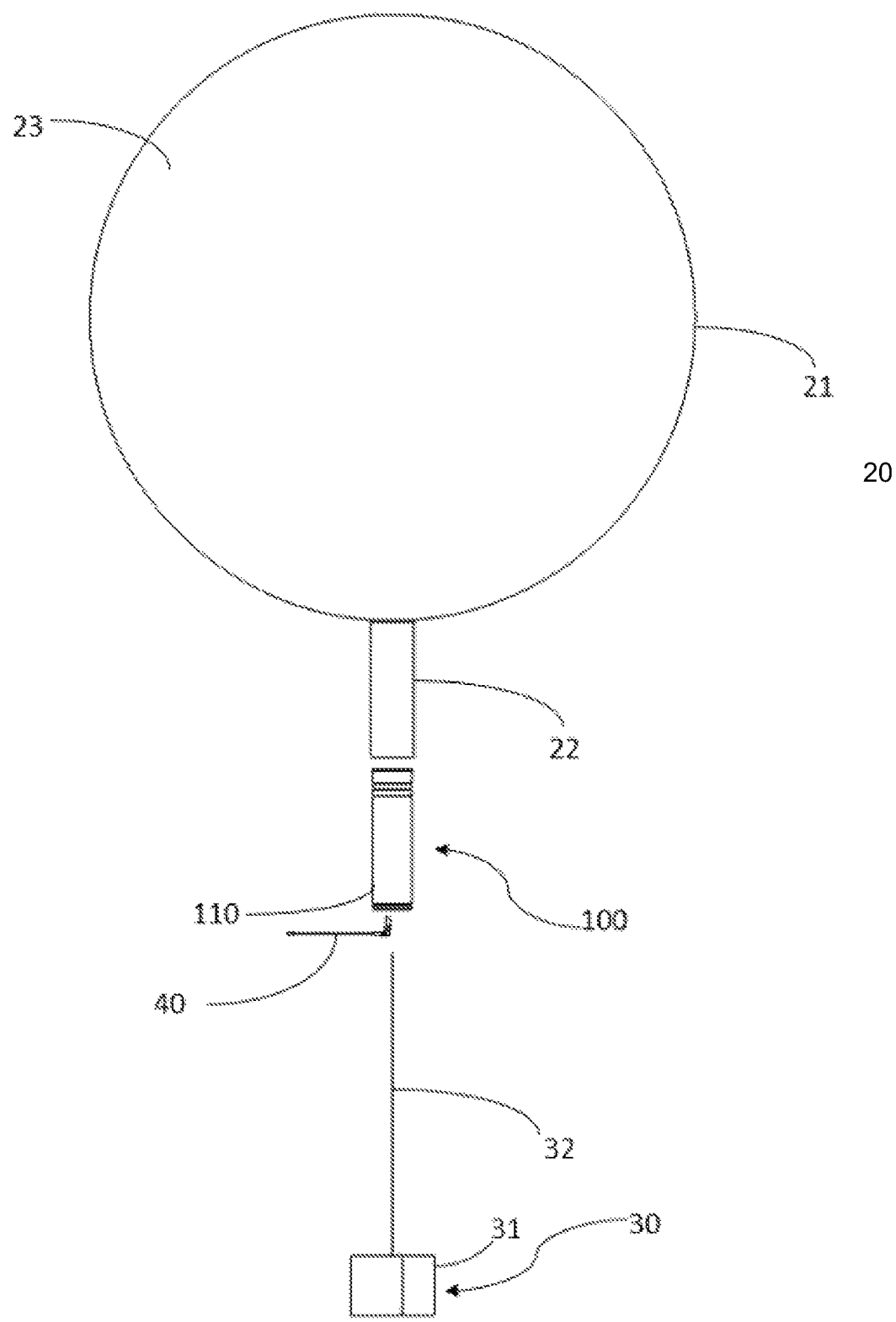
FIG. 1C is an exploded view of the altitude control system within the device as shown in FIG. 1A.

FIG. 1C illustrates an exploded view of the altitude control system 100 within the embodiment of the device shown in FIG. 1A. The altitude control system, configured to cause the balloon to operate in ascent, descent or stationary mode using an active energy addition process, provides lift-gas transfer out of or ambient air introduction into the envelope. Sensors in the altitude control system are capable of determining, recording, and responding to in-situ characteristics of the envelope, which include but are not limited to surface temperature, structural stresses, and volume of the envelope, as well as the lift-gas characteristics such as, pressure, temperature, and volume, then alters the energy of the lift-gas to change the lift gas density. In this figure, the balloon 20 comprising the envelope 21 enclosing the lift-gas 23 is connected to the neck 22; the neck 22 is also in releasable airtight contact with the altitude control system. In one embodiment, the envelope 21 can be connected with the altitude control system 100 via a clamp attaching it to the neck 22; the attachment mechanism can be as simple as using zip ties or similar removeable attachment means or a more stable or permanent clamp mechanism. In an alternate embodiment, the envelope 21 includes just the opening without the neck 22.

The view in FIG. 1C also shows the external antenna 40 positioned at the bottom of the altitude control system 100 and the payload connecting extension 32 connecting the payload component 31 including the external payload 30. The external antenna 40 can be of various types including but not limited to whip antenna, bipolar antenna, 70 cm antenna, helical antenna, or other antenna types capable of attachment with the apparatus.

Figure 1D:
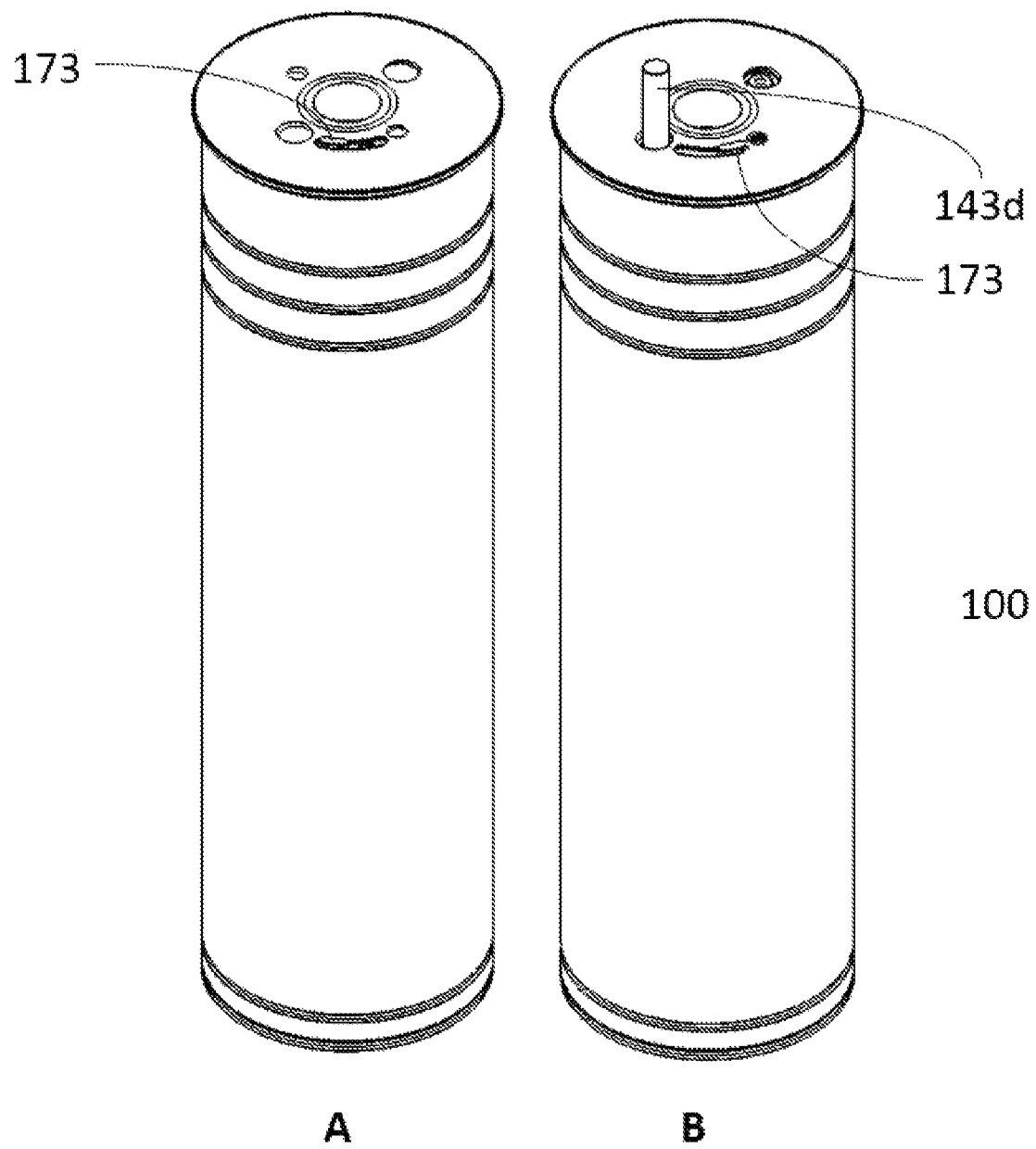
FIG. 1D is a perspective view of the altitude control system shown in FIG. 1C with (A) exposure control in closed position, and (B) exposure control in open position with active lift-gas control element deployment.

FIG. 1D is a perspective view of the altitude control system 100 shown in FIG. 1C with (A) a sliding knob 173 that actuates the exposure control, allowing changes to the volume of the lift-gas 23. With the sliding knob 173 of the exposure control 170 in closed position, shown in (A), no energy addition is introduced to the lift-gas. The altitude control system 100 is actuated when the sliding knob 173 is slid or placed in the open position as shown in (B); this open position allows for active energy control element deployment. One skilled in the art would appreciate that instead of a simple sliding knob 173 mechanism, other types of actuations could be used, such as buttons, switches, or electronic activation components or drives.

The altitude control system 100 is configured to cause the balloon 20 to operate in ascent, descent, or stationary modes, in which the attitudinal movement of the balloon 20 is caused by measuring in-situ envelope 21 and lift-gas 23 characteristics, identifying the change needed in the lift-gas energy, and facilitating the required energy change by active heat addition into the system and by regulating the lift-gas transfer out of the envelope 21 or by introducing ambient fluid inside the system or by simply allowing the passive energy dissipation of the lift-gas 23 into the surrounding environment. The altitude control system 100 may include light-emitting diode (LED) lights or similar indicators visible externally to indicate the operating state of the system.

The altitude of the balloon 20 can be varied by varying the temperature of the lift-gas 23 encompassed by the envelope 21 or by varying the amount and concentration of the lift-gas 23 within the envelope 21 of the balloon. Variable altitude is controlled by causing the volumetric expansion, compaction or reduction of the lift-gas 23 within the envelope 21. Therefore, by controlling the amount of the energy absorbed or released by the lift-gas 23 and the quantity of the lift-gas present in the balloon 20, the altitude of the balloon 20 can be controlled. The envelope 21 of the balloon 20 needs to be elastic or plastic with sufficiently large volume, which can accommodate the variations in the volumetric changes of the lift-gas 23 without bursting or rupturing.

Operationally, typical high-altitude balloons are deployed in the stratosphere, which includes altitudes between approximately 8 kilometers (km) and 50 km above the surface. The present invention enables the use of ultra-high-altitude balloons for altitudes up to the edge of the atmosphere (known as Von Kármán Line) which is 100 km above the surface, which includes the mesosphere and part of the thermosphere in addition to the stratosphere and troposphere. The invention disclosed, in general, is applicable for the entire range of altitude variations between 0 km and 100 km. In the preferred embodiment, ultra-high altitude balloons may be generally configured to operate in an altitude range between the stratosphere and the mesosphere. More specifically, the invention may generally be configured to operate at altitudes between 18 km and 80 km, although other altitudes are possible. This altitude range may be advantageous for several reasons. In particular, the balloons deployed above 18 km altitude are typically above the maximum flight level designated for commercial air traffic, and therefore, do not interfere with the commercial flights. Additionally, the higher the balloon altitude, the larger the ground coverage it can have for a ground-based payload, such as but not limited to ground observation, surveillance, communication, data and information exchange.

Figure 2:
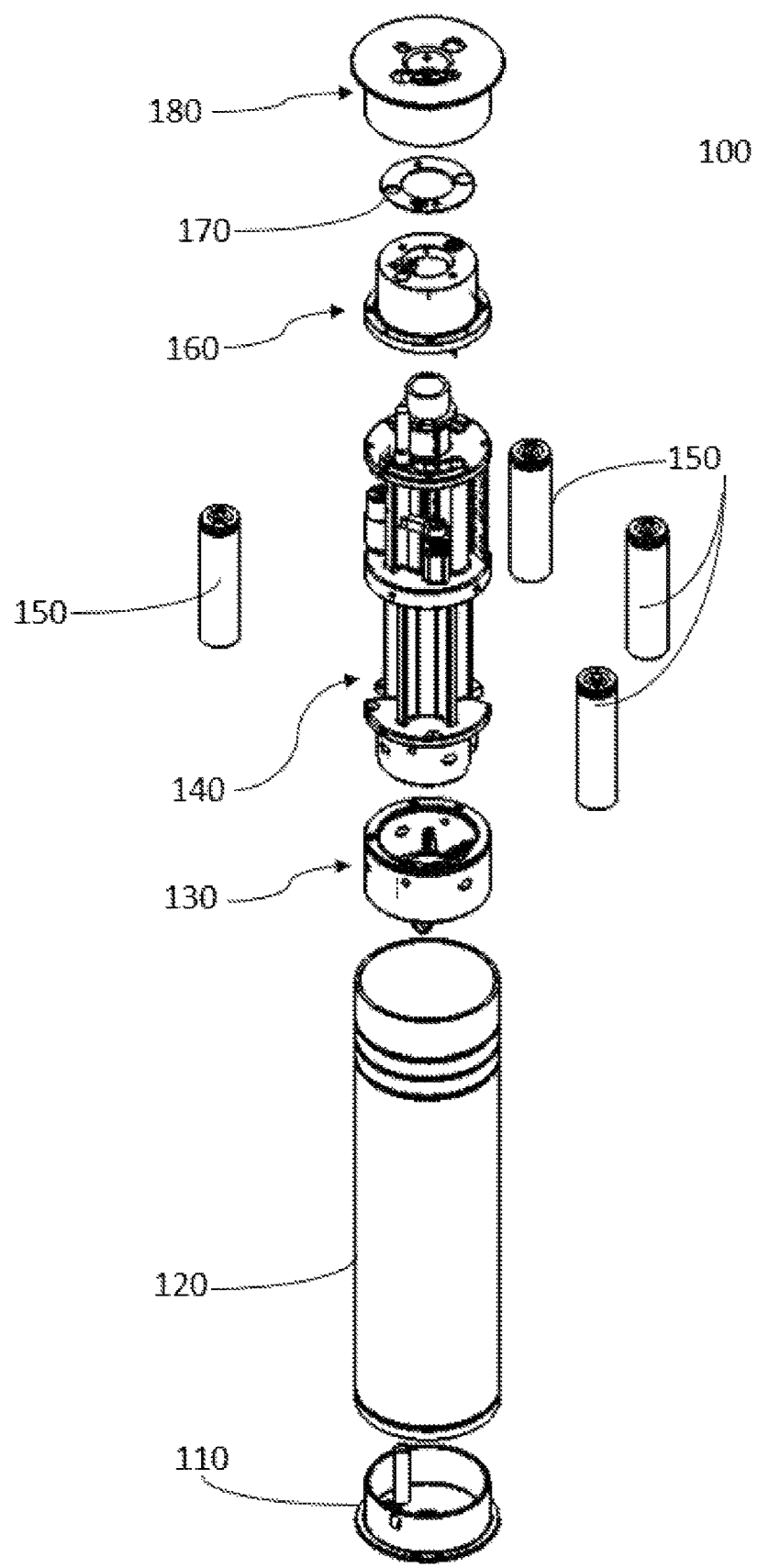
FIG. 2 is an exploded perspective view of the subassembly of the altitude control system.

FIG. 2 illustrates an exploded perspective view of the altitude control system 100, comprising an external fluid isolator 110, surface enclosure 120, control system housing 130, body 140, power source 150, characterizer 160, exposure control 170, and internal fluid isolator 180. In the preferred embodiment the surface enclosure 120 is an outer component of the altitude control system 100, providing an enclosure protecting and supporting the rest of the components and sub-assemblies. The components and sub-assemblies of preferred and various alternate embodiments are discussed in the following figures and descriptions.

Figure 3A:
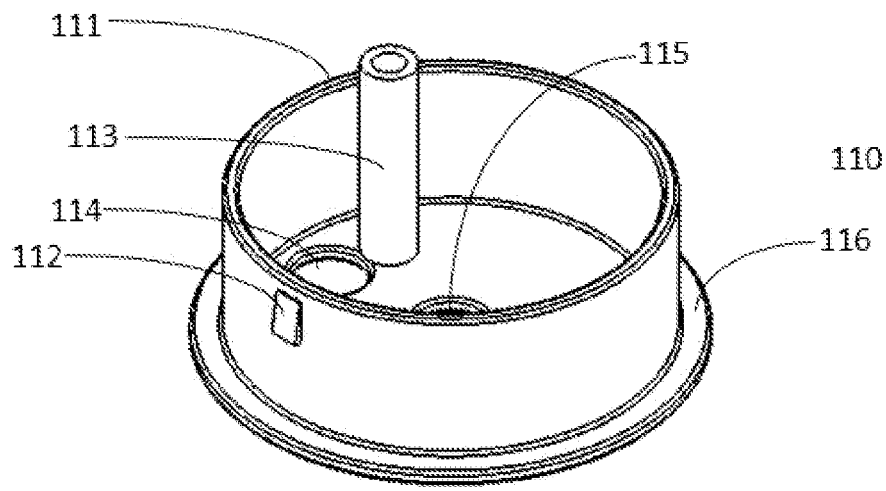
FIG. 3A is a perspective view of an embodiment providing enclosure for the altitude control system from the external environment.
Figure 3B:
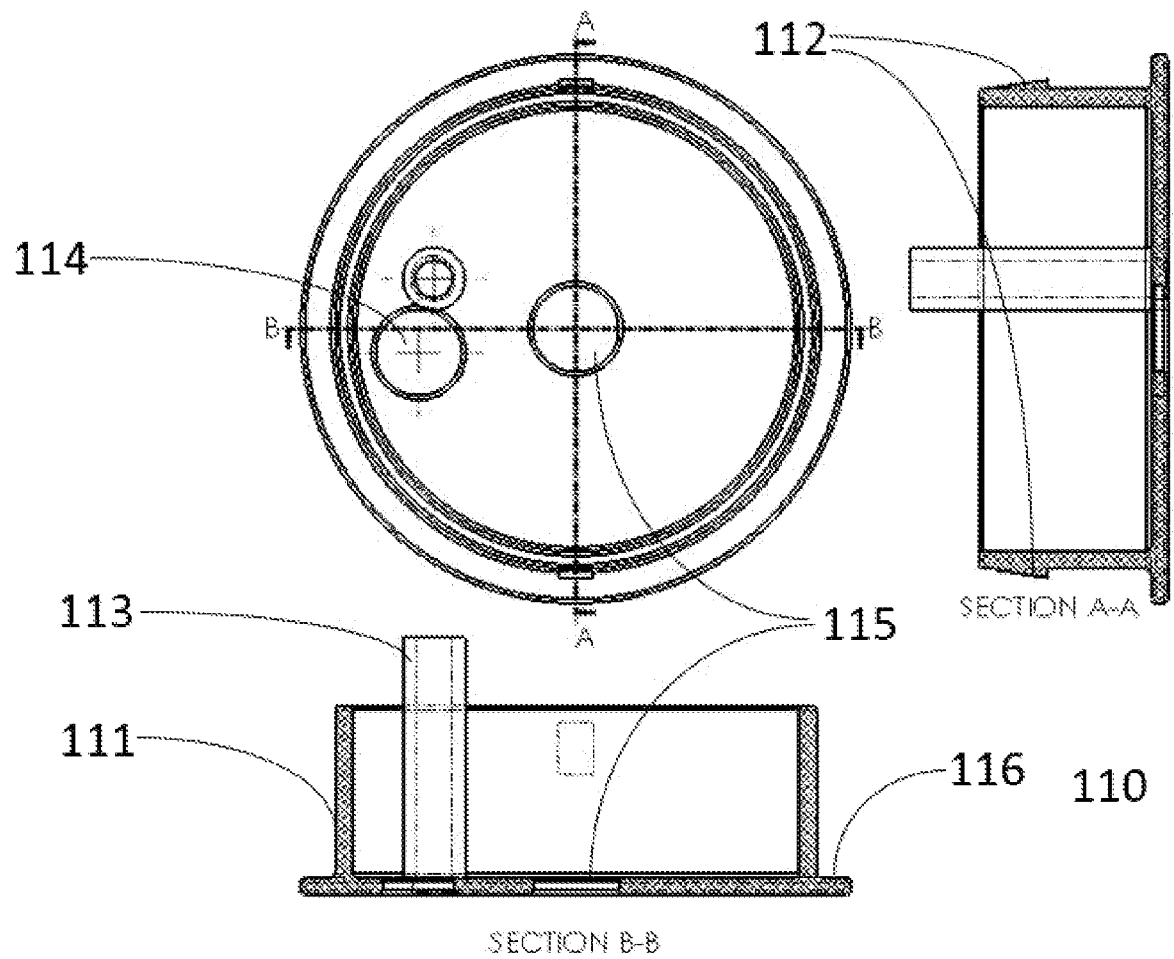
FIG. 3B shows a top view and sectional views of the illustration shown in FIG. 3A.

FIGS. 3A and 3B illustrate the external fluid isolator 110, which separates the altitude control system 100 from the ambient atmosphere. In a preferred embodiment, this external fluid isolator 110 is capable of connecting the external payload 30 to the system via the payload aperture 115, and is further capable of connecting an external antenna 40 via the antenna aperture 114. As shown in the embodiment in FIG. 3B, the external fluid isolator 110 may include an environmental aperture 113 to facilitate transfer of the lift-gas 23 out or transport of the ambient air into the altitude control system 100. A collar face 116 at a first end of the external fluid isolator 110 is in contact or continuously formed with an external fluid isolator side wall 111, which may further comprise a locking mechanism 112 capable of interacting with the surface enclosure 120 to secure the surface enclosure 120 to the external fluid isolator 110. The external fluid isolator side wall 111 of the external fluid isolator 110 is in contact with the surface enclosure 120 of the altitude control system 100. Apertures in the collar face 116, including but not limited to the antenna aperture 114 and the payload aperture 115, may be present to allow the collar face 116 to position and support the antenna, payload, or other components. One skilled in the art would appreciate that external fluid isolators 110 could operate without antenna 40 and related apertures where altitude control operates without communication with remote stations, or without payloads and related apertures, and still fall within the disclosure herein.

FIGS. 4A to 4D describe the control system housing 130 which supports and positions the system components of the altitude control system 100, and show the components of a preferred embodiment of the altitude control system 100. In the preferred embodiment shown in FIG. 4A, the control system housing 130 uses a power switch 132 to actuate the apparatus and engage the exposure control 170. Power to the system is turned on when the switch is positioned in closed state, or off when positioned in open state. In an alternate embodiment, the control system housing 130 may use on-off relay instead of the power switch 132.

Figure 4A:
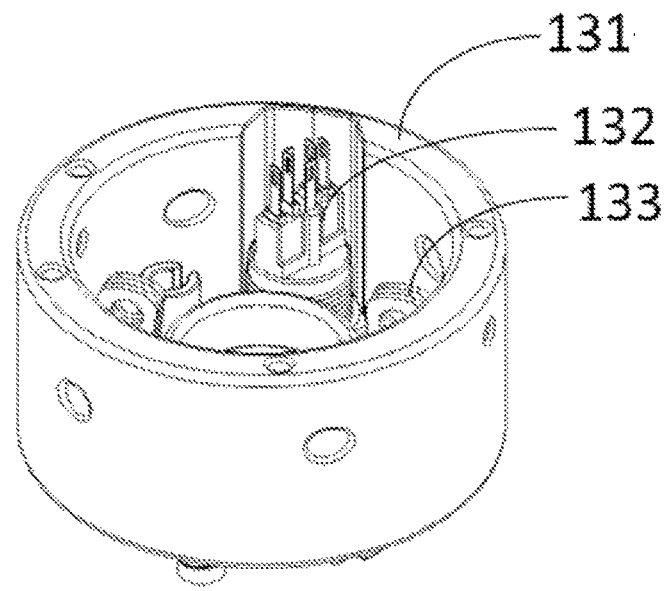
FIG. 4A is a perspective view of an embodiment of the control system housing of the altitude control system.
Figure 4B:
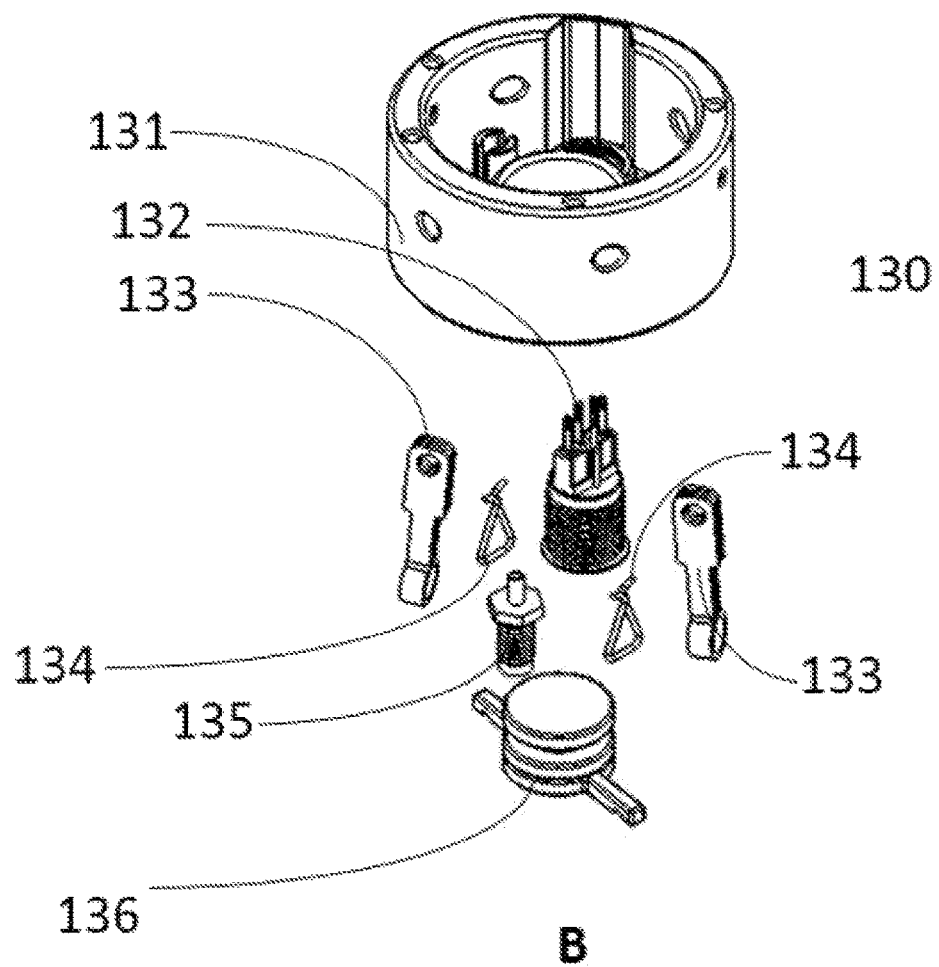
FIG. 4B is an exploded view of the embodiment of the control system housing shown in FIG. 4A.
Figure 4C:
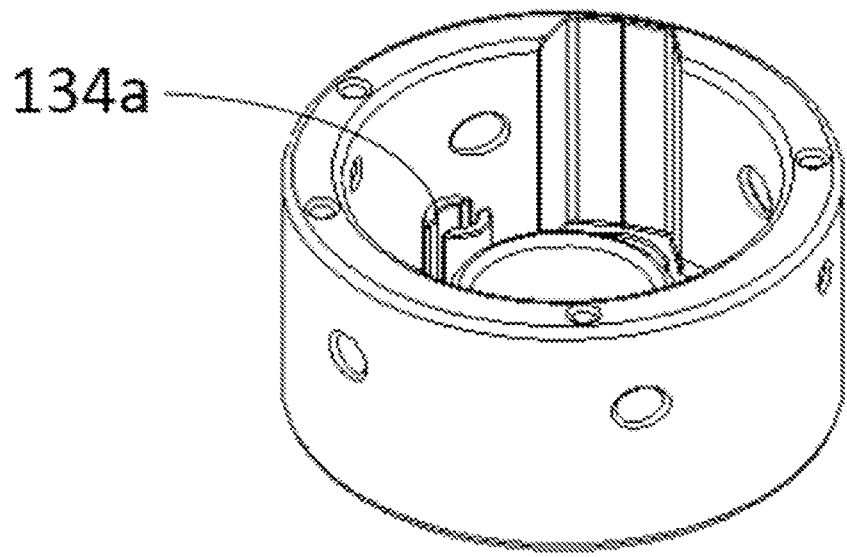
FIG. 4C is a is a simplified illustration showing the control system housing embodiment of FIG. 4A.
Figure 4D:
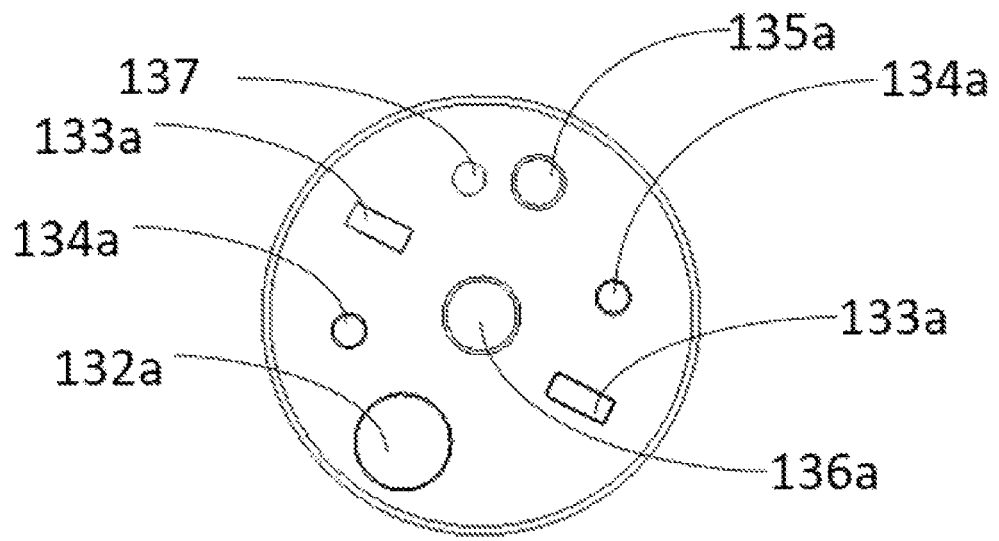
FIG. 4D is a bottom view of the control system housing embodiment illustrated in FIG. 4A.

FIG. 4B shows the various components of a preferred embodiment of the device of the invention. The hook for the payload 133 is positioned within the control system housing 130, and functions to attach the payload to the rest of the apparatus. The external payload 30 and external antenna 40 are in mechanical contact and removeably attached to the hook for the payload 133 and an antenna connection 135 of the control system housing 130 via the payload aperture 115 and the antenna aperture 114 of the external fluid isolator 110, respectively. The operations of the altitude control system 100 are accessible on the outside of the control system housing 130 via an aperture, the power switch aperture 132a. The control system housing 130 may include a cap 136 to seal the control system housing central pass-through passage 136a, facilitating the transport of the lift-gas 23 into the envelope 21. As illustrated in FIG. 4C, the control system housing 130 may include configurations or structural features, such as but not limited to a cap hook pass through aperture 134a that provide additional structural support for and position the hook for the payload 133 and cap hook 134. This allows these hooks to traverse or pass through apertures, the payload hook pass through aperture 133a and cap hook pass through aperture 134a respectively, for external payload connections. The control system housing 130 may provide access to the external antenna 40 via an antenna connection 135 passing through an antenna passage 135a. An aperture, ambient air pass-through aperture 137 facilitates a passage for the connecting element such as a tube or pipe (not shown) to connect with an environmental aperture 113 of the external fluid isolator 110 of the altitude control system 100 to allow transfer of the lift-gas 23 out or transport of the ambient air into the altitude control system 100. The control system housing 130 may provide an access to the external payload 30 via hook for the payload 133 passing via payload hook pass through aperture 133a. The cap hook 134 passing through a cap hook pass through aperture 134a can be incorporated to secure the cap 136 firmly to provide an airtight seal for the lift-gas 23 passing out of the control system housing central pass-through passage 136a during operation. In one embodiment, an external fluid isolator 110 may be in magnetic contact with the control system housing 130 forming a tight connection between these components. One skilled in the art would appreciate that the control system housing 130 may include various hooks and related apertures and support features, or not include them, as needed for antenna transmissions and desired payload 133 functions. Additionally, an alternate embodiment provides that the control system housing 130 may include in-built simple connection ports instead of the hooks for the payload 133 and cap hooks 134. Also, the cap 136 and the hook for the cap 134 of the control system housing 130 may be replaced by a magnet and magnetic attachment to provide leak proof contact with the gas transport system 142 of the body 140.

Figure 5A:
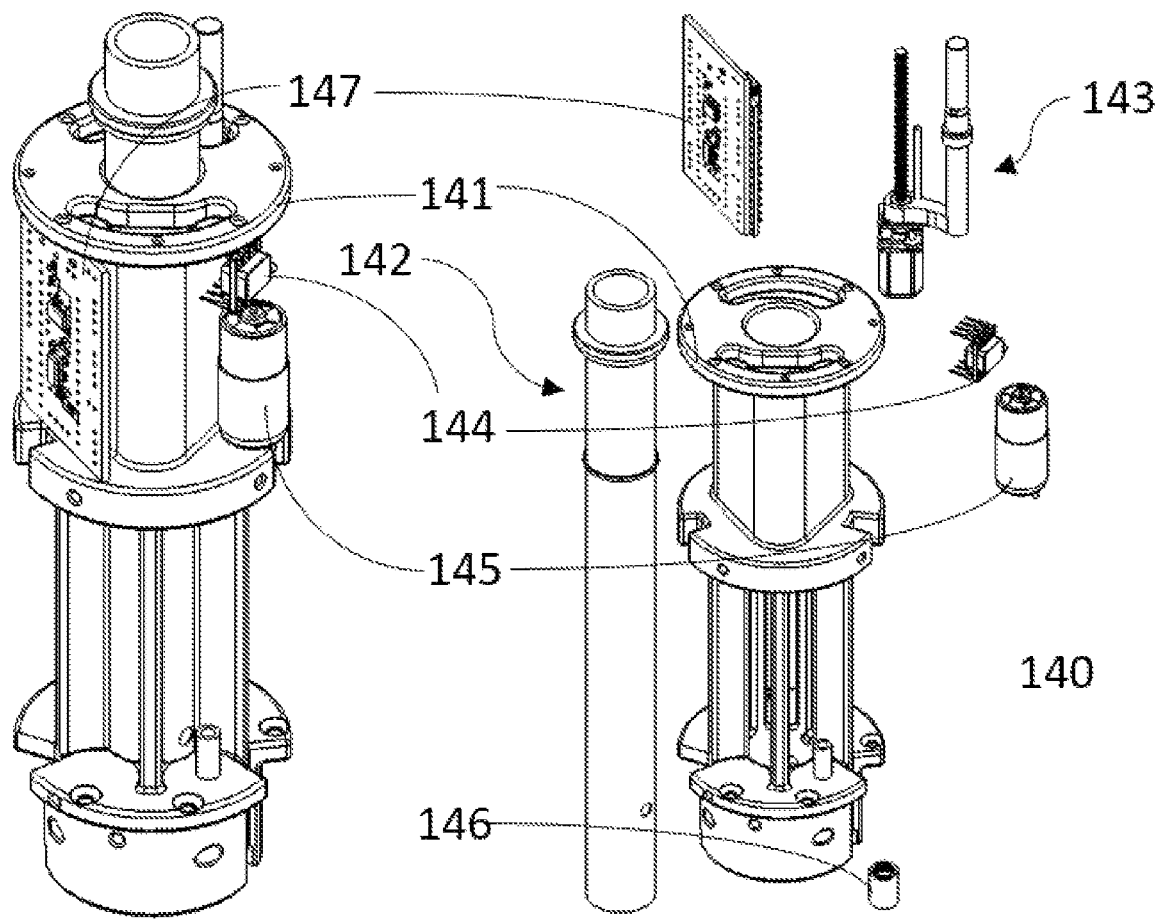
FIG. 5A is a perspective view and an exploded view of an embodiment of the altitude control system housing.
Figure 5B:
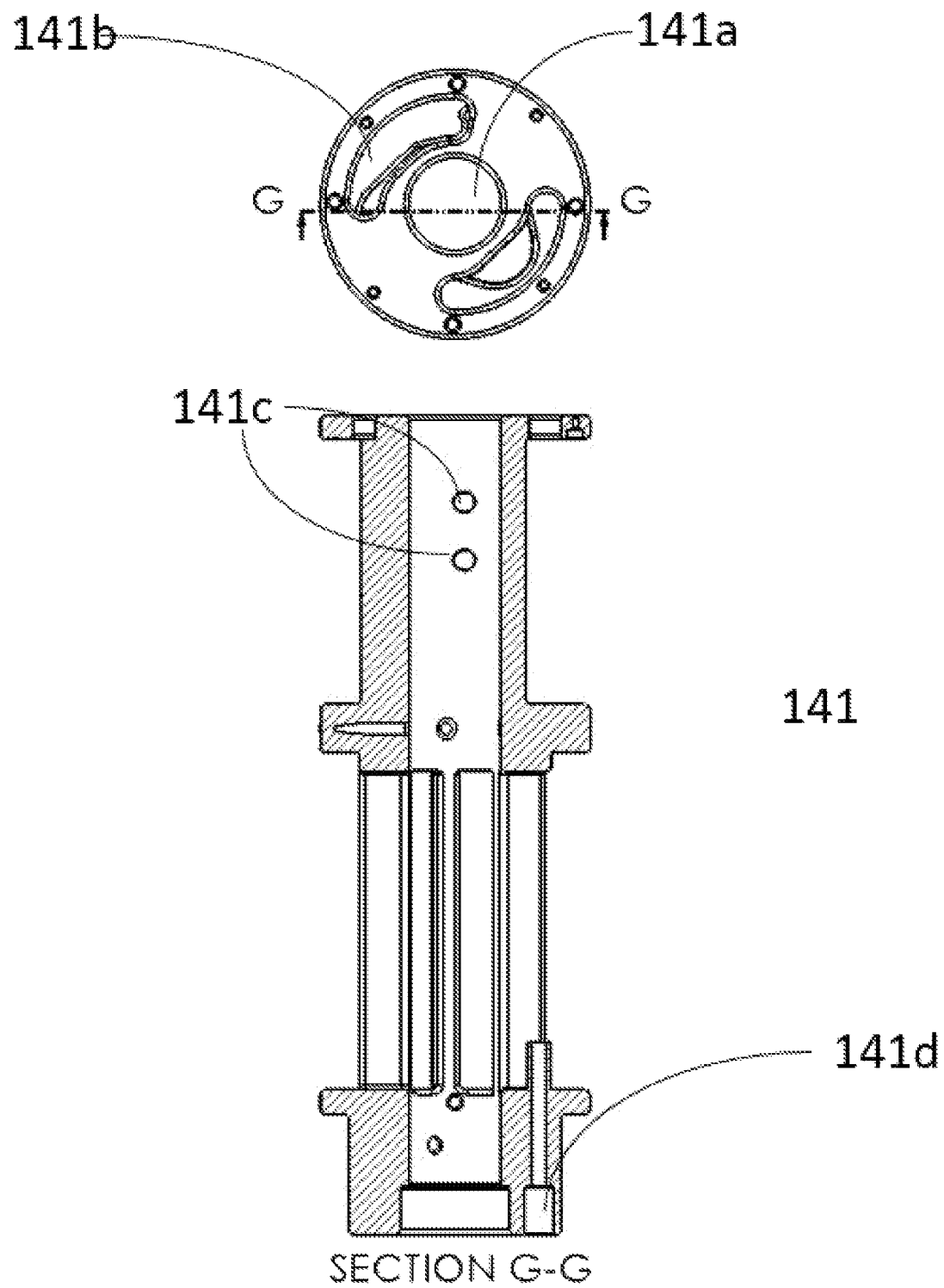
FIG. 5B is a top view and sectional view of an embodiment of the altitude control system housing shown in FIG. 5A.

FIGS. 5A-5D depict the altitude control system 100. FIG. 5A shows an exploded perspective view of an embodiment of the altitude control system 100. This figure illustrates the body 140 of the altitude control system 100 comprising a central housing 141, further described in FIG. 5B, which supports, structurally conforms to and provides a foundation for the components of the body 140. The body central pass-through passage 141a (shown in FIG. 5B) of the central housing 141 accommodates the gas transport system 142 for the transport of the lift-gas 23. The wiring passage 141b (shown in FIG. 5B) facilitates transfer of the electrical wires connecting the processor 147 with the components of the characterizer 160 (shown in FIG. 6A) for power and data transmission. The central housing tappings 141c are electrical connections (shown in FIG. 5B) that facilitate passage for the transport of the connections between the flow element tappings 142d (shown in FIG. 5B) of the gas transport system 142 and the flow sensing device 144 for the transport of the lift-gas 23 or an ambient air. In the preferred embodiment, the body 140 accommodates a gas transport system 142 to allow the fluid, either the lift-gas 23 or an ambient air, to pass through and regulate in any direction. Alternatively, the gas transport system 142 may not be in contact with the central housing 141 concentrically.

Figure 5C:
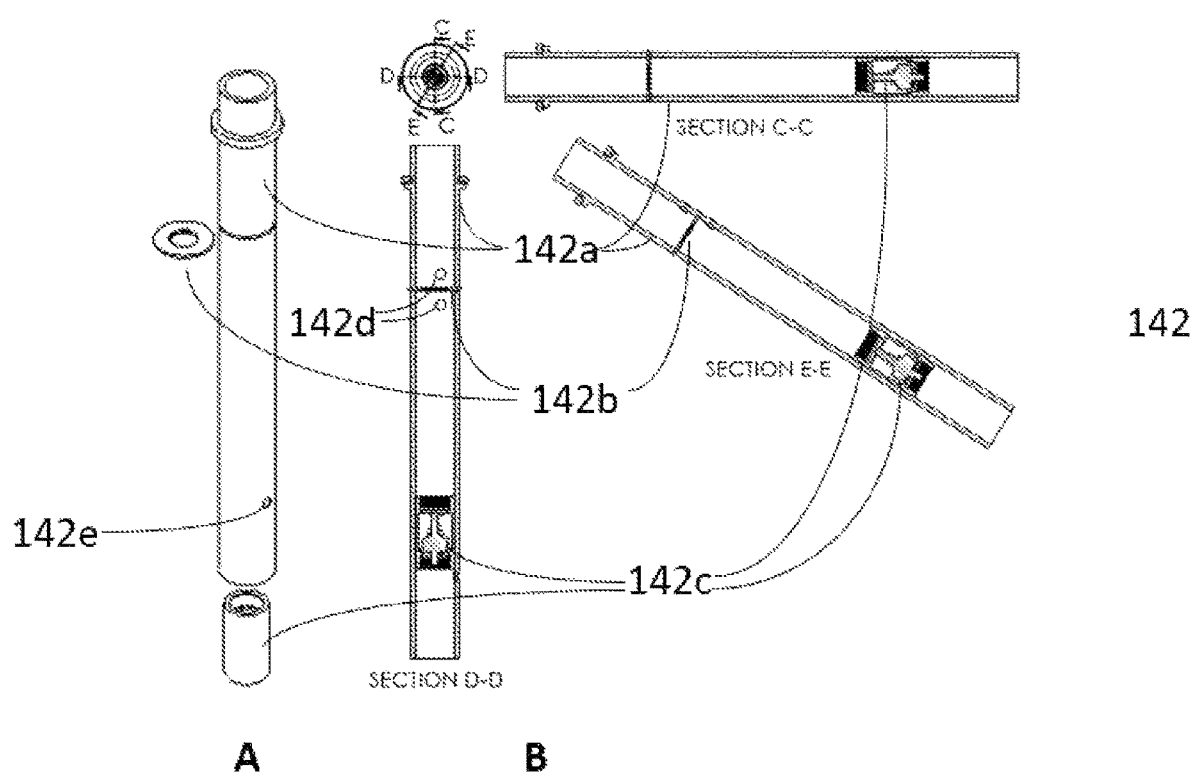
FIG. 5C illustrates an embodiment of the lift-gas transport system showing (A) an exploded perspective view; and (B) a top view, and sectional views of the top view showing sections C-C, D-D and E-E as drawn in the top view.

FIG. 5C illustrates a gas transport system 142, which comprises a flow conduit 142a which forms a passage for the gas transport; a flow element 142b such as an orifice plate or venture plate, to generate the measurements and data for the lift-gas 23 during the transport in to or out of the envelope 21; an in-flow control device 142c to regulate the flow or transport in or out of the system such as a directional flow control valve or check valve; the flow element tapping 142d to facilitate the connections for the detection of the variations in the flow of a lift-gas 23 generated by flow element 142b and an ambient tapping 142e to provide flow bypass either for the regulated transport of the lift-gas 23 out of the system or for the regulated transport of an ambient air into the system via an environmental flow control device 146 of the body 140; and a passage for the environmental flow control device 141d of the central housing 141. Alternatively, the flow control devices 142c and 146 may be electro-mechanical, operated and controlled electrically and in electrical contact with the processor 147 of the body 140.

Figure 5D:
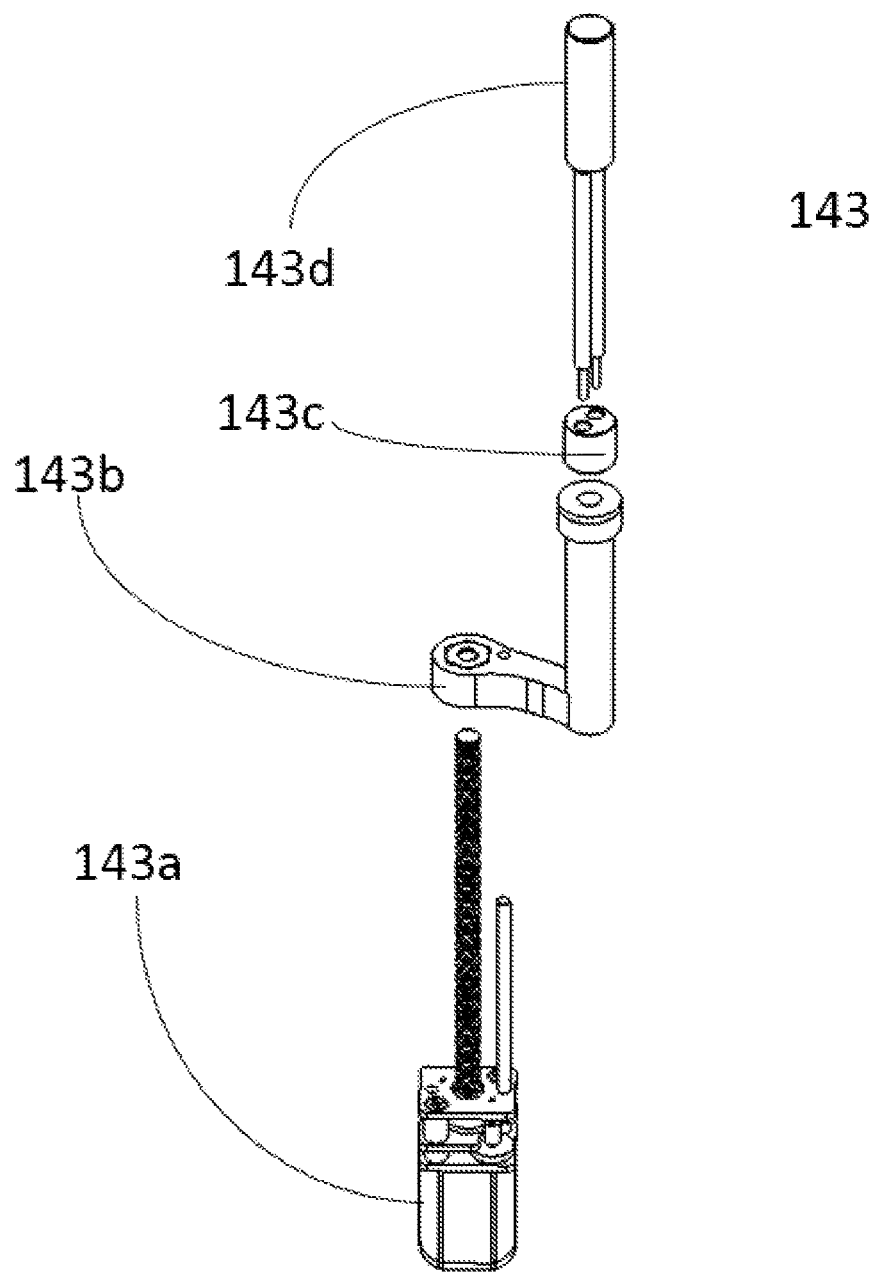
FIG. 5D is an exploded perspective view of an embodiment of the active energy addition system.

FIG. 5D details the active energy addition system 143. The central housing 141 provides a structural foundation for the active energy addition system 143 capable of using heat to add energy into the lift-gas 23, to increase the size of the envelope 21, which facilitates the increase in the altitude of the balloon 20. In the preferred embodiment shown in FIG. 5D, an active energy addition system 143, further comprising an active energy addition element 143d supplies energy to the lift-gas 23 by electrothermal heat transport. Based on an electrical resistive heating, an active energy addition element 143d transforms energy supplied in the form of electricity via a power source 150 of the altitude control system 100, converting it into thermal energy in the form of heat addition into the lift-gas 23 via radiation and convection modes of heat transfer. In the radiation mode of heat transfer, an active energy addition element 143d radiates heat into its surrounding, which is primarily absorbed by the internal surface of the envelope 21, resulting in increasing of the surface temperature of the envelope 21. In the convection mode of heat transfer, the lift-gas 23, which is in surface contact with an active energy addition element 143d as well as with the internal surface of an envelope 21, exchanges heat with the heat from the contacting surfaces via surface convection and tries to reach to the state of balanced heat transfer, which results in increases in the temperature of the lift-gas 23. This increase in the temperature facilitates expansion of the lift-gas 23, and therefore the expansion of the envelope 21, which ultimately results in increase in the altitude of the balloon 20.

The deployment of an active energy addition element 143d is isolated from the rest of the active energy addition system 143, via an isolator 143c. The active energy addition system 143 may comprise a heating system using natural gas, propane gas or ethanol, or other similar combustion-based heating systems; however, a number of alternative heating systems could be used to provide heat to the lift-gas 23. These may include, but are not limited to lift-gas 23 heating systems using: UV (Ultra-Violet) light; infrared (IR) radiation; ultra-sonic heating; heat-pipe mechanisms; boiling heat transfer mechanisms. The active energy addition system 143 optionally includes a motor 143a facilitating motorized control and a slider housing 143b, such that they are in slidable association; however, one skilled in the art would appreciate that it also may be a fixed system without the sliding motion between the motor 143a and the slider housing 143b. The motor 143a enables the translation of an active energy addition element 143d via the slider housing 143b by sliding along the rotational axis of the motor 143a. The motorized control may be provided to secure the active energy addition element 143d within the altitude control system 100 when not in use, and to expose the active energy addition element 143d to the lift-gas 23 encompassed with the envelope 21 by extending out of an altitude control system 100. In another embodiment, the motorized control of the active energy addition system 143 may be replaced by a magnet with a magnetic connection using electromagnetic control, in which a slider and slider housing 143b is capable of sliding along the rotational axis of the motor 143a, and facilitating electromagnetic control.

In a preferred embodiment, the body 140 accommodates a flow sensing device 144 for the detection of the variations in the flow of a lift-gas 23 or ambient air passing through a flow conduit 142a and the variations generated by the flow element 142b. The body 140 may include a flow regulator 145 such as a pump or a motor 143a to regulate either the flow of lift-gas 23 leaving the system or the flow of ambient air entering the system via a mechanical environmental flow control device 146 such as a direction control valve or a check valve, which in turn manages the amount and/or concentration of the lift-gas within the envelope 21. This facilitates decreasing the size of the envelope 21, resulting in the descent of the balloon, or halting either the expansion or the compaction of the envelope 21 accommodating the stationary mode of the balloon 20. In one embodiment, the environmental flow control device 146 comprises an electro-mechanical component in electrical contact with the processor 147.

Also, in a preferred embodiment the body 140 includes a processor 147 to conduct onboard data and signal processing operations, which include but are not limited to: lift-gas 23 regulation; lift-gas 23 characterization; characterization of the envelope 21; ambient air regulation and characterization; regulation, control and characterization of an active energy addition system 143; management and regulation of a power source 150; monitoring and controlling of sensing devices and controllers, along with the data and information transfer with the remote stations via an external antenna 40. The processor 147 may also include wireless capabilities such as Bluetooth, BLE (Bluetooth Low Energy), Wi-Fi, or NFC (near-field communication) to communicate with nearby and/or peripheral devices for data and information transfer. The body 140 may also optionally include a GPS system which will be in electrical connection with the processor 147 for data and power transfer.

Figure 6A:
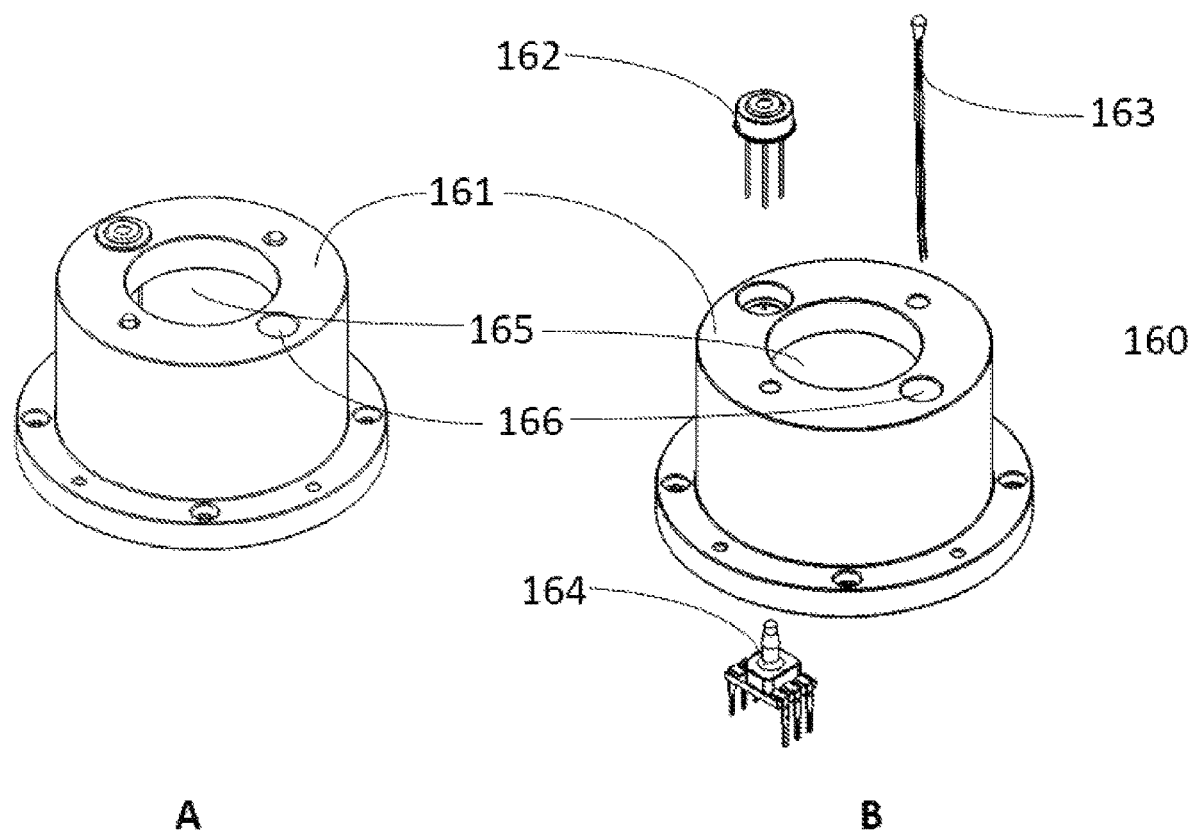
FIG. 6A is a simplified diagram illustrating an embodiment of the characterizer housing, showing (A) a perspective view, and (B) an exploded view of (A).
Figure 6B:
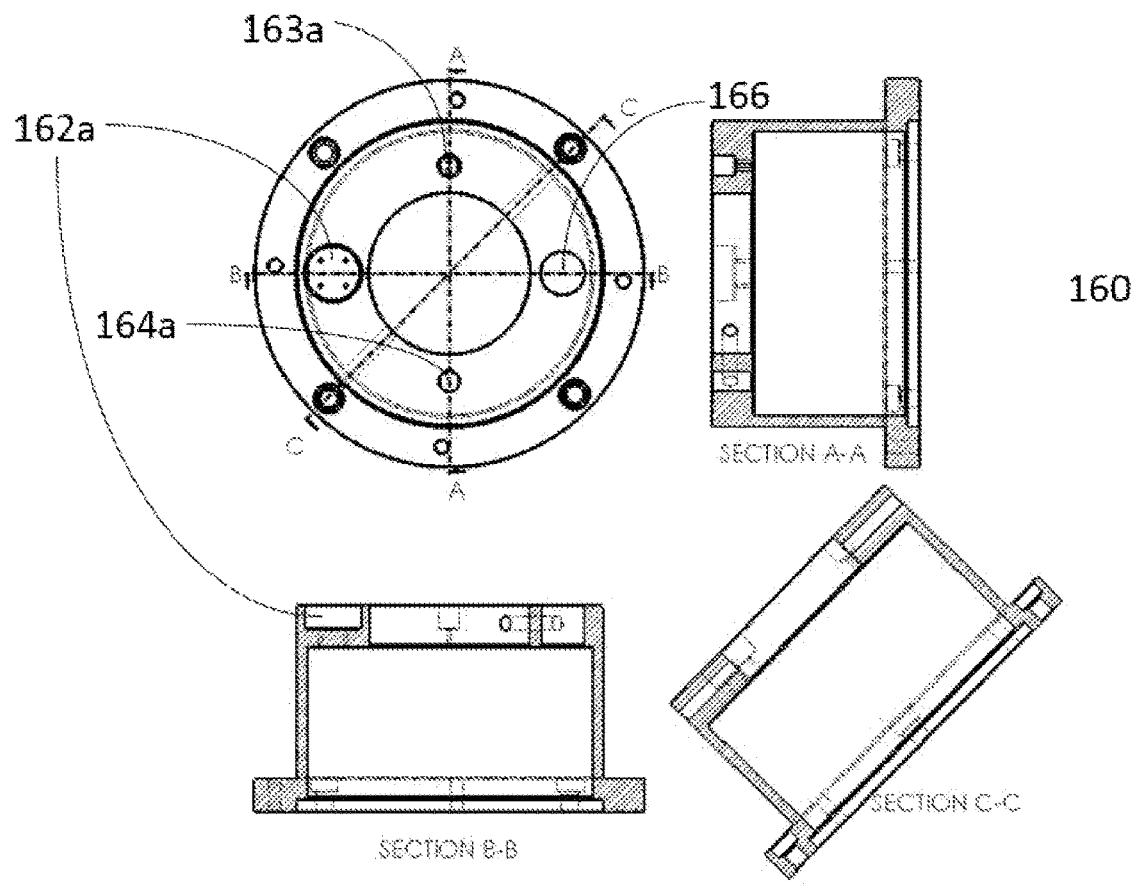
FIG. 6B is a top view and sectional views of the top view along the lines A-A, B-B and C-C as shown in the top view and sectional views of FIG. 6A.

FIG. 6A shows perspective and exploded views of an example embodiment of the characterizer 160, which accommodates an infrared (IR) device 162 housed within the IR device housing 162a to detect the characteristics of the envelope 21. FIG. 6B shows top and sectional views of the characterizer 160 of FIG. 6A. The system detects in-situ characteristics of the envelope 21 including but not limited to surface temperature, structural stresses, and volume of the envelope, as well as lift-gas 23 characteristics, such as but not limited to pressure, temperature, and volume, from a plurality of sensors, then alters the energy of the lift-gas to change the lift-gas density. One or more processors (hereinafter "a processor" or "the processor(s)") 147 capture and translate the information from said sensors, including direct contact sensors 163 and pressure sensors 164. The processors 147 may include, or may be connected with, micro-processing or storage components capable of capturing, storing and integrating data received from the connected sensors, actuators, and other system components. The envelope 21 will attain an equilibrium temperature influenced by the temperature of the external ambient fluid, typically air, and the temperature of the internal lift-gas 23. The IR device 162, controlled and operated by a processor 147 of the body 140, continuously detects the temperature variations of the envelope 21 occurring because of the varying internal and external thermal conditions across the boundaries of the envelope 21 resulting from the ascent, descent, or stationary mode travel of the balloon 20. The characterizer 160 may include a direct contact sensor 163 such as a thermistor, housed at 163a and controlled by processor 147 of the body 140, to detect and measure the variations in the temperature of the lift-gas 23 in the envelope 21. The characterizer 160 may also include a pressure sensor 164, housed within the pressure sensor housing 164a, and controlled by the processor 147 of the body 140, to detect and measure the variations in the pressure of the lift-gas 23 within the envelope 21. The characterizer 160 may also optionally include a distance meter (not shown) controlled by the processor 147 of the body 140 to measure and capture information relating to the distance of the polar edge of the envelope 21. Distance meter measurements enable direct measurement of the variations in the volumetric expansion or compaction of the lift-gas 23, and therefore provide quantitative information of variations in the size of the envelope 21, which in turn provides quantitative information about the operation of the system in ascent, descent, and stationary modes.

The characterizer 160 detects and quantifies physical data such as temperature, pressure, diameter and therefore the state of the envelope 21 and the lift-gas 23. This information along with flow transfer information from the gas transport system 142 and flow regulator 145 of the body 140 is utilized by the processor 147 to generate a control signal. This signal is sent to generate regulated and controlled output from the active energy addition system 143 of the body 140, to provide the desired operating mode transport of the balloon 20, either ascent, descent, or stationary. The characterizer central pass-through passage 165 facilitates a passage for the flow conduit 142a of the body 140.

The processor 147 receives and processes the temperature data from the IR device 162 and the diameter data from the distance meter, and translates it into key indicators relevant to state of the envelope 21 in the form of temperature, volume, and stress of the envelope 21, at any instant. During the initial inflation or the filling of the balloon 20, the processor 147 records the total amount of the lift-gas 23 filled in the envelope 21 using the data received from the flow sensing device 144. The processor 147 also transforms the temperature data received from the direct contact sensor 163 and pressure data from the pressure sensor 164 into key indicators of the state of the lift-gas 23 at any instant, in the form of temperature, pressure, and volume data specific to the lift-gas 23. The processor 147 may be pre-programmed to operate in default setting in which the altitude variation of the balloon 20 is achieved using the pre-set desired altitude information, or to operate in remote setting in which the altitude variation of the balloon 20 is achieved using the pre-set desired altitude information updated during the operation and calculated with the new altitude information received from a remote station.

The processor 147 may be operated in a plurality of modes; two distinct modes are contemplated in the preferred embodiment including at least a simple and an accurate mode, which may be pre-programmed or may be set by externally wired or wireless connected device. In simple operating mode, the processor 147 is programmed to maintain the temperature of an envelope 21 within the set limits throughout the balloon transit, which may vary by as much as 5 degrees. In an accurate operating mode, the processor 147 is programmed to detect the current altitude and state of the balloon, compare it against the desired altitude and state of the balloon, then generate the control signals to achieve the desired variations in the balloon altitude. For the accurate operating mode, the processor 147 may be equipped with a GPS or similar devices producing real-time altitude information. For the balloon ascent, the processor 147 identifies the required volumetric change in the envelope 21, and therefore estimates the amount of energy that needs to be added into the lift-gas 23, which is then supplied by activating an active energy addition element 143d for the estimated operating period. For the descent mode of balloon transit, the processor 147 identifies required volumetric change in the envelope 21, and therefore estimates the amount of energy for removal out of the lift-gas 23, which is then removed, depending on the state of the envelope 21 and the lift-gas 23, either by removing estimated mass of the lift-gas 23 out of the envelope 21 or adding ambient air into the envelope 21 via activation of the flow regulator 145, or simply passively removing the desired energy by natural convective interaction of the envelope 21 with the surrounding environment, or the combination of these methods. In the stationary mode of the balloon, the processor 147 performs the operations of the balloon ascent and/or descent modes of transfer as needed to achieve and maintain the stationary state of the balloon. The processor 147 is powered using the power source 150, and it is actuated using the power switch 132. The electronics components of the altitude control system 100 are powered and operated via the processor 147. In an alternate embodiment, a set including the IR device 162, direct contact sensor 163 and pressure sensor 164 may be added into the flow conduit 142a to characterize the lift-gas condition inside the flow conduit 142a at any given time.

Figure 7:
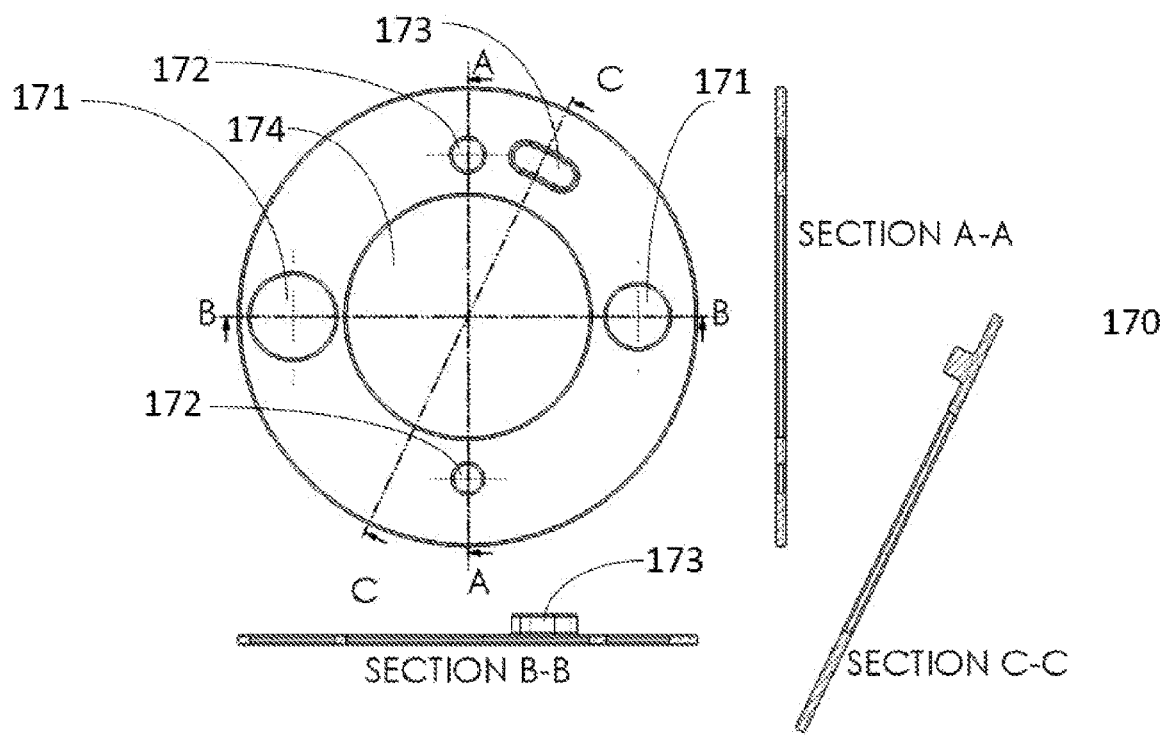
FIG. 7 is a top view and sectional views of an embodiment of the exposure control component of the altitude control system, with sections A-A, B-B and C-C illustrated in the top view and as separate sections.
Figure 8:
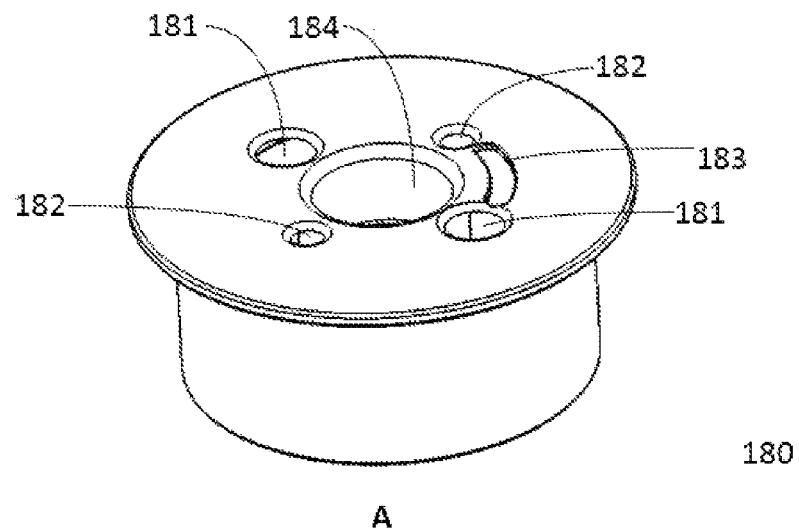
FIG. 8 is a simplified diagram illustrating an embodiment of the internal fluid isolator in (A) a perspective view, and (B) a bottom view.
Figure 8:
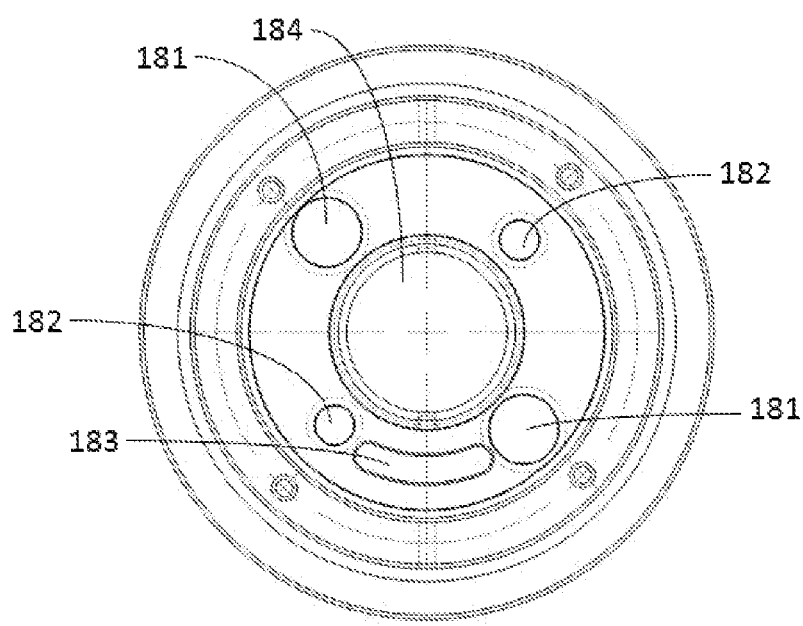

FIG. 7 is a top view and associated sectional views of an embodiment of the exposure control 170 component of the altitude control system 100, with sections A-A, B-B and C-C illustrated in the top view and as separate sections. In a preferred embodiment, the exposure control 170 is included to control the exposure of the sensors and devices of the characterizer 160 to the lift-gas 23 within the envelope 21. The exposure control 170 is actuated by sliding the knob 173 along the groove 183 of the internal fluid isolator 180, shown in FIG. 8. The knob 173 matingly conforms to the groove 183, such that sliding the knob 173 enables alignment or misalignment of the exposure control large aperture 171 and exposure control small aperture 172 with that of the internal fluid isolator 180 and the IR device housing 162a, the direct contact sensor housing 163a, the pressure sensor housing 164a and pass through aperture 166 of the active energy addition element 143d, thereby exposing the sensors and controllers of the IR device 162, the direct contact sensor 163, pressure sensor 164 and active energy addition element 143d to the lift-gas 23 in the envelope 21. The exposure control central pass-through passage 174 encompasses a passage for the flow conduit 142a of the body 140. The sliding of the exposure control 170 may be automated using a motorized system. Alternatively, an electro-magnetic system controlled by the processor 147, may be utilized for the sliding of the exposure control 170. In another embodiment, the exposure control 170 is eliminated completely, and the internal fluid isolator 180 is twisted against the characterizer 160 to facilitate the exposure of the sensors and devices of the characterizer 160 to the lift-gas 23.

FIG. 8A and FIG. 8B illustrate an internal fluid isolator 180, which functions to encapsulate and separate the components of the altitude control system 100 from being exposed to the lift-gas 23 and to avoid the energy leakage out of the envelope 21. The internal fluid isolator 180 allows lift-gas 23 or ambient air to pass through the flow conduit 142a of the body 140 via the internal fluid isolator central pass through passage 184. The surface of the internal fluid isolator 180 exposed to the lift-gas 23 may be coated with the reflective coating such as aluminum to reflect the incident thermal radiation emitted from the active energy addition element 143d towards the surface of the envelope 21.

Figure 9:
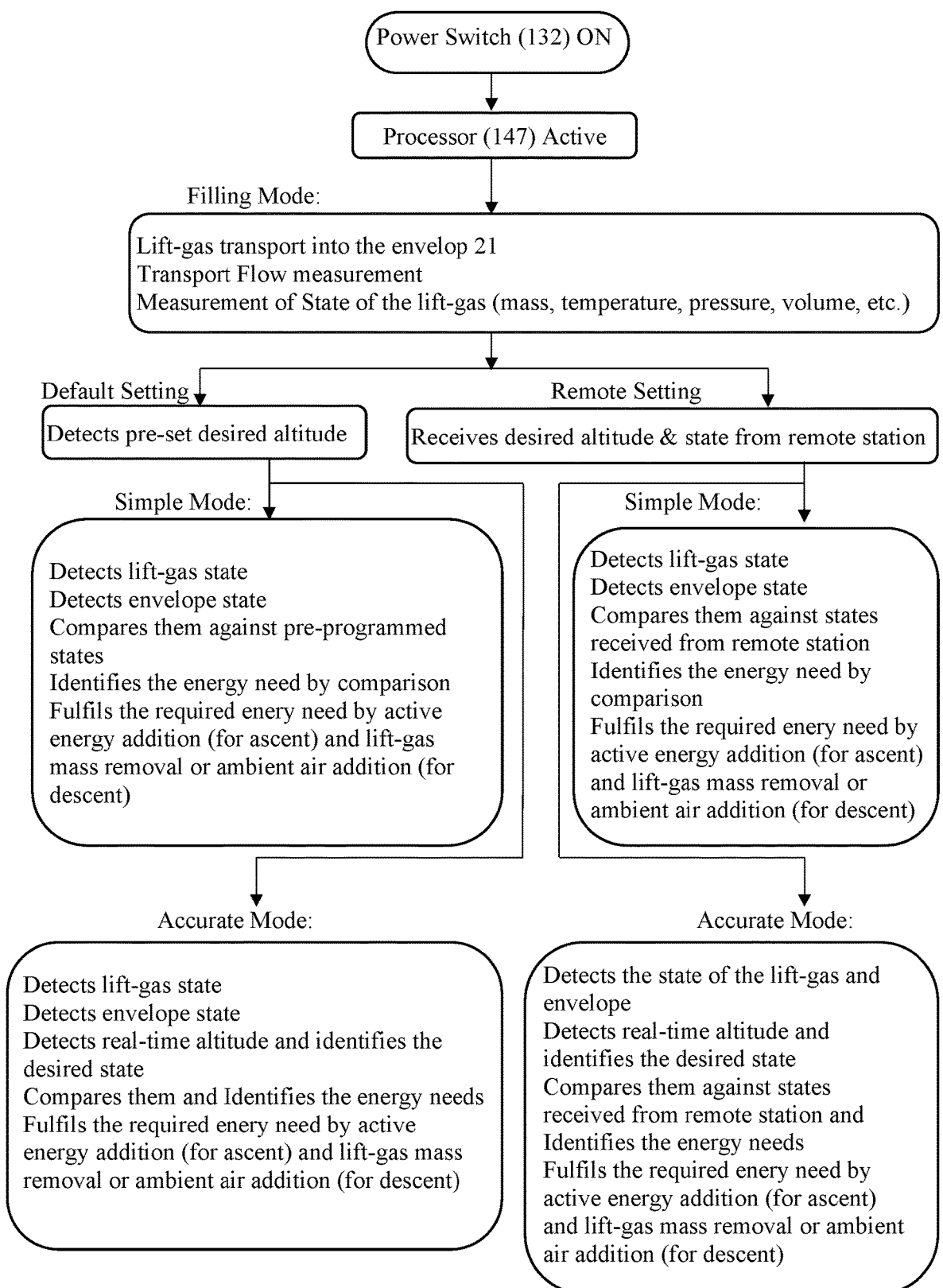
FIG. 9 is a flow diagram illustrating a method of use of the invention.

FIG. 9 is a flow diagram illustrating a preferred method of use of the apparatus and the system of the invention. The system's operation and control are autonomous; the apparatus functions on its own using preprogrammed information either in a default mode, wherein the information for operations has been pre-programmed into the system, or a remote mode, which enables the system to detect, acquire and use data transmitted remotely from a source outside of the apparatus. This can be accomplished through the antenna 40 or other data reception/transmission components. A user first activates a processor 147 by manipulating the power switch 132 to engage an on-position or a closed state, preparing the apparatus for the addition of lift-gas 23. The processor 147 then sequentially goes through the filling mode, followed by a default setting or a remote setting, and then in either the default or remote setting the system operates in simple mode or accurate mode. Each of these modes of operation are further described below. One skilled in the art would appreciate that these modes are exemplary in nature and other modes could be described and still be within this disclosure, and that the method could operate in a different sequence or order and remain consistent with this disclosure.

Filling Mode: The user facilitates the transport of the lift-gas 23 through flow conduit 142a via directional in-flow control device 142c and the flow element 142b, into the balloon 20 by inflating the envelope 21. During this lift-gas transport the flow element 142b produces the flow measurements of the lift-gas 23 being transferred via tapings 142d to the flow sensing device 144, which data is then recorded by the processor 147. The user places the cap 136 in the position sealing the control system housing central pass-through passage 136a with the compressive force applied by the hooks for the cap 134. The in-flow control device 142c and the cap 136 ensure no leakage of the lift-gas out of the system. The processor 147 then estimates the total amount of the lift-gas 23 within the envelope 21 and the state of the lift-gas 23 and the envelope 21, by receiving the temperature, pressure, and diameter data from the IR device 162, direct contact sensor 163, the pressure sensor 164, and the distance meter (not shown), at the completion of the filling mode. The user then places the external fluid isolator 110 in position. At this point the user may attach an external antenna 40 to the antenna connection 135 of the control system housing 130, and an external payload 30 to the hook for the payload 133 of the control system housing 130. At this point the balloon 20 is launched.

Default Setting: The processor 147, in default setting, detects pre-programmed desired altitude information and facilitates the transport of the balloon to the pre-programmed altitude in simple mode or accurate mode.

Simple Mode in Default Setting: In this mode of balloon transport, the processor 147 records the state of the envelope 21 and the lift-gas 23, compares them against the pre-programmed state at any instant, identifies the divergence of the temperature of the envelope 21 and facilitates desired power supply to the active energy addition element 143d, which then radiates heat into the lift-gas 23 and on the internal surface of the envelope 21, to maintain the temperature of the envelope 21 within the set limits, for example but not limited to +/−5° C. or +/−10° C. of the temperature variation, in addition to achieving the desired state of the envelope 21. This maintenance of the envelope 21 temperature within the set limits adds heat into the lift-gas 23, causing its volumetric expansion and therefore transport or ascent of the balloon to the pre-programmed altitude.

Accurate Mode in Default Setting: In this mode of balloon transport, the processor 147 records the state of the envelope 21 and the lift-gas 23, records the real-time altitude detected from on-board positioning system, such as GPS, evaluates the desired state based on the real-time altitude information, and compares them at any instant, identifies the divergence of the temperature of the envelope 21 and facilitates desired power supply to the active energy addition element 143d, which then radiates heat into the lift-gas 23 and on the internal surface of the envelope 21, to achieve the desired state of the envelope 21. This heat addition into the lift-gas 23, facilitates the volumetric expansion and therefore ascent of the balloon transport.

Remote Setting: The processor 147, in remote setting, detects desired altitude or other relevant operational information from a remote aerial or ground-based station during the transport and facilitates the transport of the balloon to the desired altitude in simple mode or accurate mode.

Simple Mode in Remote Setting: In this mode of balloon transport, the processor 147 records the state of the envelope 21 and the lift-gas 23, compares them against the desired state received from the remote station at any instant, identifies the divergence of the temperature of the envelope 21 and facilitates desired power supply to the active energy addition element 143d, which then, to achieve the balloon ascent, radiates heat into the lift-gas 23 and on the internal surface of the envelope 21, to maintain the temperature of the envelope 21 within the set limits (for example +/−5° C. or +/−10° C.) of the temperature variation, such that the envelope 21 temperature is within the set limits of the surrounding environment temperature. This maintenance of the envelope 21 temperature within the set limits while mitigating the divergence, adds heat into the lift-gas 23, causing its volumetric expansion and therefore transport or ascent of the balloon 20 to the desired altitude. To achieve the balloon descent the processor 147 facilitates the desired power supply to the flow regulator 145 to transfer either the mass of the lift-gas 23 out of an envelope 21 to the external environment, or the mass of ambient air into the envelope 21, or simply by passive dissipation of the lift-gas 23 into the surrounding environment, depending on the state of the envelope 21, state of the lift-gas 23, the time of the day and the environmental conditions pre-determined before the execution of the descent mode. To maintain the balloon position in the stationary mode, the processor 147 performs balloon ascent and/or descent modes of transfer as needed to achieve the stationary state of the balloon.

Accurate Mode in Remote Setting: In this mode of balloon transport, the processor 147 records the state of the envelope 21 and the lift-gas 23, records the real-time altitude detected from on-board positioning system, such as GPS, compares them against the desired state received from the remote station at any instant, identifies the divergence of the temperature of the envelope 21 and facilitates desired power supply to the active energy addition element 143d, which then radiates heat into the lift-gas 23 and on the internal surface of the envelope 21, to achieve the desired state of the envelope 21, and therefore the balloon ascent. This mitigation of the divergence adds heat into the lift-gas 23, causing its volumetric expansion and therefore transport or ascent of the balloon to the desired altitude. To achieve the balloon descent, depending on the state of the envelope 21, the state of the lift-gas 23, the time of the day and the environmental conditions, pre-determined before the execution of the descent mode, the processor 147 then facilitates the desired power supply to the flow regulator 145 to transfer either the mass of the lift-gas 23 out of an envelope 21 to the external environment, and therefore reducing the volume of the balloon, or the mass of the ambient air into the envelope 21, and therefore reducing the lift-gas 23 temperature and the volume of the envelope 21, or simply by letting the lift-gas 23 energies dissipate passively in the surrounding environment, and therefore reducing the volume of the balloon. To maintain the balloon position in the stationary mode, the processor 147 performs balloon ascent and/or descent modes of transfer as needed to achieve the stationary state of the balloon.

Unless otherwise defined, all technical and scientific terms used herein have the same meaning as commonly understood by one of ordinary skill in the art to which this invention belongs. Although methods and materials similar to or equivalent to those described herein can be used in the practice or testing of the balloon altitude control by in-situ characterization and active energy management, suitable methods and materials are described above. All publications, patent applications, patents, and other references mentioned herein are incorporated by reference in their entirety to the extent allowed by applicable law and regulations. The balloon altitude control by in-situ characterization and active energy management may be embodied in other specific forms without departing from the spirit or essential attributes thereof, and methodology can be performed in different relative order; it is therefore desired that the present embodiment be considered in all respects as illustrative and not restrictive. Any headings utilized within the description are for convenience only and have no legal or limiting effect.

I claim:

1. An apparatus for balloon altitude control, comprising a balloon capable of withstanding extreme environmental and weather conditions at altitudes up to at least 80 km above Earth's surface and controlled and operated autonomously, the apparatus further comprising:
   a. an expandable envelope capable of surrounding and containing a lift-gas, wherein said envelope is in releasable air-tight contact with a neck and is further capable of mechanical and electronic interaction with an altitude control system;
   b. the lift-gas releasably contained within the envelope wherein said lift-gas is a gas that is lighter than, heavier than, or equal to an ambient fluid of an environment in which the apparatus operates; and wherein the lift-gas responds to an addition or removal of energy by expanding or contracting, and causes the envelope to expand or contract;
   c. the neck being in removeable air-tight contact with the envelope, wherein said neck removably surrounds at least a portion of the altitude control system;
   d. a body comprising a central housing that supports and structurally conforms to said body, and where said body is in contact with the altitude control system and a gas transport system;
   e. the altitude control system being contained within and supported by the body, wherein said altitude control system further comprises a characterizer including one or more processors capable of power and data quantification and transmission; the altitude control system being configured to cause the balloon to operate in ascent, descent or stationary mode using an active energy management process to provide energy addition into the lift-gas, passive energy removal from the lift-gas, lift-gas transfer out of the envelope, or ambient fluid (air) introduction into the envelope;
   f. the gas transport system being contained within and supported by the body, wherein said gas transport system is capable of facilitating passage for the lift-gas transport into and out of the envelope, facilitating a foundation for generating an electrical signal during the lift-gas transport, and facilitating the central housing support of the altitude control system, the gas transport system being for quantifying an amount of the lift-gas entering or leaving the gas transport system;
   g. an active energy management system further comprising an active energy addition system with a plurality of sensors capable of detection and measurement of in-situ characteristics, and wherein the plurality of sensors are in contact with the one or more processors of the altitude control system, and the one or more processors are capable of capturing and processing data received from the plurality of sensors; and wherein said one or more processors are integrated with one or more controllers enabling receiving, storing and processing of qualitative and quantitative data from the plurality of sensors and further capable of transferring said qualitative and quantitative data to a remote station or receiver;
h. a power source;
i. an antenna component; and
k. a payload component.

2. The apparatus of claim 1 wherein the envelope comprises one or more sheets of a durable, flexible, and gas-impermeable material consisting of rubber, polyethylene, latex or mylar.

3. The apparatus of claim 2 wherein the envelope comprises materials capable of passively absorbing solar energy and wherein absorbed solar energy can be used by the apparatus to reduce an amount of active energy addition used for altitude control.

4. The apparatus of claim 1 wherein the one or more controllers integrated with the one or more processors of the active energy addition system cooperate to actively monitor and control the altitude control system; and the altitude control system further comprises:
 a. an external fluid isolator separating the altitude control system from an ambient atmosphere and in contact with or continuously formed with an external fluid isolator side wall; said external fluid isolator further comprising:
  i. a locking mechanism in said external fluid isolator side wall capable of interacting with and locking a surface enclosure,
  ii. an environmental aperture, and
  iii. an ambient air pass-through aperture;
 b. a surface enclosure that protects and supports the altitude control system; said surface enclosure comprising a collar with a collar face comprising a plurality of apertures including at least an antenna aperture and a payload aperture;
 c. a control system housing including one or more apertures, a central pass-through passage, a cap to seal the central pass-through passage, and a power switch or relay to actuate the apparatus and engage an exposure control component;
 d. an internal fluid isolator further comprising a small aperture, a large aperture, a groove and a central pass through passage;
 e. the power source; and
 f. an exposure control component.

5. The apparatus of claim 1 wherein the lift-gas present in the envelope is quantified by the characterizer, and said characterizer further comprises:
 a. an infrared device capable of capturing and transmitting the qualitative and quantitative data from the plurality of sensors relating to in-situ characteristics of the envelope and lift-gas and environmental conditions within and surrounding the apparatus to the one or more processors; and
 b. the one or more processors and on or more controllers are integrated with each other and with the characterizer; and the one or more processors, the one or more controllers, and the characterizer cooperate to actively monitor and control the apparatus.

6. The apparatus of claim 4 wherein the external fluid isolator is in mechanical contact with and connected to the control system housing, and is enclosed within the surface enclosure, the surface enclosure being releasably connected to the antenna component and the payload component.

7. The apparatus of claim 1 further comprising a distance meter controlled by the one or more processors that measures information relating to a distance of a polar edge of the envelope, and wherein the measured information enables direct measurement of the variations in a volumetric expansion or contraction of the lift-gas.

8. The apparatus of claim 1 wherein a central housing provides a structural foundation for the active energy addition system and the active energy management system further comprises an active energy addition element electronically connected with the power source and capable of executing radiation and convection heat transfer modes, a heat source, and an isolator separating the active energy addition element from a remainder of the active energy addition system; and wherein the active energy addition system is capable of using heat generated by the active energy management system to add energy into the lift-gas, increasing a size of the envelope and facilitating increase in the altitude of the balloon.

9. The apparatus of claim 8 wherein the active energy management system includes a motor facilitating motorized control.

10. The apparatus of claim 8 wherein the active energy addition system includes a magnet and magnetic connection with a slider and a magnet housing capable of sliding along a rotational axis of a motor and facilitating electromagnetic control.

11. The apparatus of claim 1 wherein the gas transport system further comprises a flow conduit that forms a passage for gas to be transported through; a flow element to generate data relative to the lift-gas during the transport into or out of the envelope; an in-flow control device that regulates transport in or out of the gas transport system; one or more flow element tappings to facilitate connections for detecting variations in a flow of lift-gas; an environmental flow control device; and passage connecting the environmental flow control device with the central housing.

12. The apparatus of claim 11 wherein the environmental flow control device is electro-mechanical, operated and controlled electrically, and in electrical contact with a processor of the one or more processors capable of characterization and regulation of the lift-gas, the ambient air, the envelope, and the active energy management system.

13. The apparatus of claim 1 wherein the antenna component comprises an antenna aperture, and said antenna component is in mechanical contact and removably attached to an antenna connection to a control system housing.

14. The apparatus of claim 1 wherein the payload component comprises a payload pass-through hook aperture and a payload hook positioned within said payload pass-through hook aperture and a payload connecting extension to connect an external payload with the apparatus.

15. The apparatus of claim 4 wherein the exposure control component comprises a slidable knob, a groove which supports and matingly conforms to the slidable knob, an exposure control large aperture and an exposure control small aperture capable of positioning the internal fluid isolator and active energy addition system controls, and wherein the exposure control component is motorized or powered electronically or electromagnetically.

16. The apparatus of claim 4 wherein the internal fluid isolator is coated with a reflective coating to reflect incident thermal radiation emitted from an active energy addition element.

17. A method of using the apparatus of claim 1 comprising:
  i. activating power by configuring a power switch to an ON position;
  ii. engaging and activating the one or more processors in default mode;
  iii. engaging a filling mode, thereby initiating lift-gas transport into the envelope;
  iv. engaging the plurality of sensors and capturing and recording transport flow measurement data;
  v. capturing and recording sensor data identifying and measuring a state of the lift-gas including at least mass flow, temperature, pressure, and volume data;
  vi. detecting pre-programmed desired altitude information;
  vii. engaging default pre-programmed information and applying the default pre-programmed information in a simple mode or an accurate mode, where either
    a. In simple mode, the apparatus
      1. Detects lift-gas and envelop qualitative and quantitative state characteristics data;
      2. Compares the qualitative and quantitative state characteristics data against pre-programmed state data;
      3. Identifies the energy requirement by comparison between the detected qualitative and quantitative state characteristics data and the pre-programmed state data; and
      4. Fulfils the required energy need by actuating the active energy management process which facilitates energy addition for ascent, or by actuating the process of lift-gas mass removal or the process of ambient fluid addition or passive energy removal from the lift-gas for descent or various combinations of ascent and descent for stationary mode; or
    b. In accurate mode, the apparatus
      1. Detects lift-gas and envelop qualitative and quantitative state characteristics data;
      2. Detects real-time altitude and identifies the desired state;
      3. Identifies an energy requirement by comparison between detected lift-gas, envelope, and altitude characteristics data; and
      4. Fulfils the required energy need by active energy addition for ascent and lift-gas mass removal or ambient air addition or passive energy removal from the lift-gas for descent or various combinations of ascent and descent for stationary mode.

18. The method of claim 17 further comprising the steps of:
  A. detecting and acquiring remotely transmitted information from a source outside of the apparatus; and
  B. processing the detected remotely transmitted information using the one or more processors and comparing the detected remotely transmitted information with in-situ measured or quantified information or the pre-programmed information and applying pre-programmed, in-situ quantified, remotely acquired and comparative data in simple mode or accurate mode.

* * * * *